United States Patent
Go et al.

(10) Patent No.: US 12,109,610 B2
(45) Date of Patent: Oct. 8, 2024

(54) APPARATUS AND METHOD FOR MOLDING MATERIAL

(71) Applicants: Dong Keun Go, Busan (KR); Myoung Su Go, Busan (KR)

(72) Inventors: Dong Keun Go, Busan (KR); Myoung Su Go, Busan (KR)

(*) Notice: Subject to any disclaimer, the term of this patent is extended or adjusted under 35 U.S.C. 154(b) by 102 days.

(21) Appl. No.: 17/758,592

(22) PCT Filed: Oct. 28, 2020

(86) PCT No.: PCT/KR2020/014813
§ 371 (c)(1),
(2) Date: Jul. 11, 2022

(87) PCT Pub. No.: WO2021/145538
PCT Pub. Date: Jul. 22, 2021

(65) Prior Publication Data
US 2023/0339015 A1    Oct. 26, 2023

(30) Foreign Application Priority Data
Jan. 14, 2020  (KR) .................. 10-2020-0004873

(51) Int. Cl.
*B22D 17/22* (2006.01)
*B22D 17/00* (2006.01)
(Continued)

(52) U.S. Cl.
CPC ....... *B22D 17/2227* (2013.01); *B22D 17/002* (2013.01); *B22D 17/14* (2013.01);
(Continued)

(58) Field of Classification Search
CPC ............ B22D 18/02; B21J 5/002; B21J 5/004
See application file for complete search history.

(56) References Cited

U.S. PATENT DOCUMENTS 3,669,593 A * 6/1972 Cyriax .................. B22D 17/26
425/451.2
2013/0269903 A1   10/2013 Bergeron et al.

FOREIGN PATENT DOCUMENTS

JP      H05-002913 U    1/1993
JP      H06-000618 A    1/1994
(Continued)

*Primary Examiner* — Kevin E Yoon
*Assistant Examiner* — Jacky Yuen
(74) *Attorney, Agent, or Firm* — KORUS Patent, LLC; Seong Il Jeong

(57) ABSTRACT

Proposed are an apparatus for molding a material, and a method for molding a material by using the apparatus. The apparatus includes first and second fixed platens (110 and 120) provided as a pair and spaced a predetermined distance from each other by tie bars (150), a movable platen (140) movable along the tie bars (150) between the first and second fixed platens (110 and 120), a mold (200) which is provided with a movable mold (220) and a fixed mold (240) and which forms a molding space (260) that is capable of being open or closed as the movable mold (220) moves in a direction toward or away from the fixed mold (240), and a pressing block (300) selectively positioned between the first fixed platen (110) and the movable mold (220) such that the pressing block is capable of applying a pressure to the movable mold (220).

5 Claims, 22 Drawing Sheets

(51) Int. Cl.
  *B22D 17/14* (2006.01)
  *B22D 17/20* (2006.01)
  *B22D 18/02* (2006.01)
(52) U.S. Cl.
  CPC ....... *B22D 17/203* (2013.01); *B22D 17/2038* (2013.01); *B22D 18/02* (2013.01)

(56) References Cited

FOREIGN PATENT DOCUMENTS

| | | |
|---|---:|---|
| JP | 2019-217725 A | 12/2019 |
| KR | 10-1997-0010071 A | 3/1997 |
| KR | 10-1999-0002669 A | 1/1999 |
| KR | 20-0332906 Y1 | 11/2003 |
| KR | 10-2004-0077047 A | 9/2004 |

\* cited by examiner

APPARATUS AND METHOD FOR MOLDING MATERIAL

TECHNICAL FIELD

The present disclosure relates to an apparatus and a method for molding a material such as metal or plastic. More particularly, the present disclosure relates to an apparatus and a method for molding a material, the apparatus and the method being capable of shortening a process cycle.

BACKGROUND ART

A mold apparatus is an apparatus for molding a material such as metal or plastic to a specific shape by injecting the material into a molding space (cavity) and pressing the material. The material injected into the molding space may be a molten metal in a liquid state, or a semi-molten metal in a solid state. Further, in a process of injecting the material or a process of releasing a molded article, a process of opening and closing the molding space is necessarily performed while the material is molded. Typically, there are forging molding, injection molding, die casting molding, and so on, and an appropriate mold apparatus is used according to an injected material.

In a typical mold apparatus, the molding space is formed between a movable mold and a fixed mold, and the molding space is open or closed as the movable mold is moved forward or backward. According to the type of the mold apparatus, a punch is provided in the movable mold. For example, the punch is provided in a forging molding-type mold apparatus.

Meanwhile, a hydraulic cylinder is used for moving the movable mold forward or backward, the movable mold being a heavy object. At this time, since the movable mold is the heavy object and is also to be supported under high pressure during a process of molding the material, the hydraulic cylinder has a large diameter of a cylinder. In addition, since a space sufficient to release a molded article is required to be secured, a length of the cylinder is also formed long enough. As a result, the hydraulic cylinder having a large size is used.

However, there is a problem that an operation time is increased as a size of the hydraulic cylinder increases. Therefore, when a hydraulic cylinder having a large size is used, an overall time of molding of a product with a mold apparatus is increased. That is, the process cycle is increased. Further, since the usage of hydraulic oil and energy consumption increase due to the use of a hydraulic cylinder having a large size, there is a problem that overall economic feasibility is reduced.

DISCLOSURE

Technical Problem

Accordingly, the present disclosure has been made keeping in mind the above problems occurring in the related art, and an objective of the present disclosure is to provide an apparatus and a method for molding a material, the apparatus and the method being capable of significantly shortening a process cycle and being capable of reducing energy consumption.

Technical Solution

In order to achieve the above objective, according to the present disclosure, there are provided an apparatus for molding a material and a method for molding various materials by using the apparatus, the apparatus including: first and second fixed platens which are provided as a pair and spaced a predetermined distance from each other by tie bars; a movable platen formed such that the movable platen is capable of moving along the tie bars between the first and second fixed platens; a mold which is provided with a movable mold formed on the movable platen and with a fixed mold formed on the second fixed platen and which forms a molding space in a point where the movable mold and the fixed mold are in contact with each other such that the molding space is capable of being open or closed; and a pressing block selectively positioned between the first fixed platen and the movable platen, the pressing block being capable of applying a pressure to the movable mold.

Advantageous Effects

According to the apparatus for molding the material and to the method for molding the material by using the apparatus, since the hydraulic cylinder having the large size is not used, the process cycle is shortened, and economic feasibility is increased since the usage of hydraulic oil and energy consumption is also reduced.

BEST MODE

Figure 1:
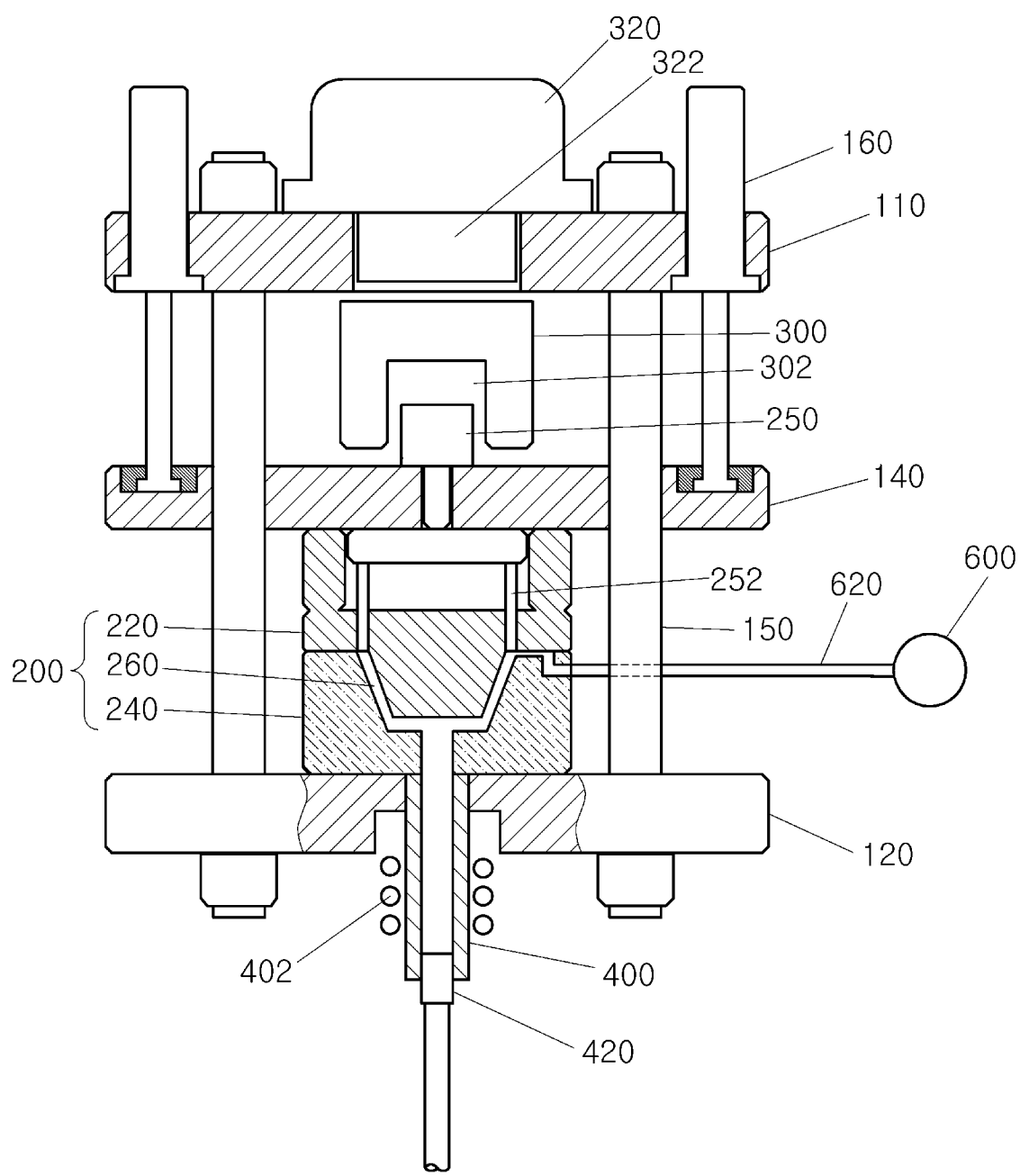
FIG. 1 is an exemplary view illustrating a front configuration of a die casting apparatus according to an embodiment of the present disclosure.

The present disclosure may be applied to various apparatuses molding various materials by using a mold formed of a movable mold and a fixed mold. For example, such as die casting apparatuses, forging apparatuses, and so on may be the various apparatuses, and the various materials include a material such as metal, plastic, and so on that are formed by a mold apparatus. Hereinafter, the present disclosure will be described in detail with reference to the attached drawings FIGS. 1 to 22. Further, in the drawings, FIGS. 1 to 10 illustrate an embodiment in which the present disclosure is applied to a die casting apparatus molding a material by injecting a molten material.

Figure 2:
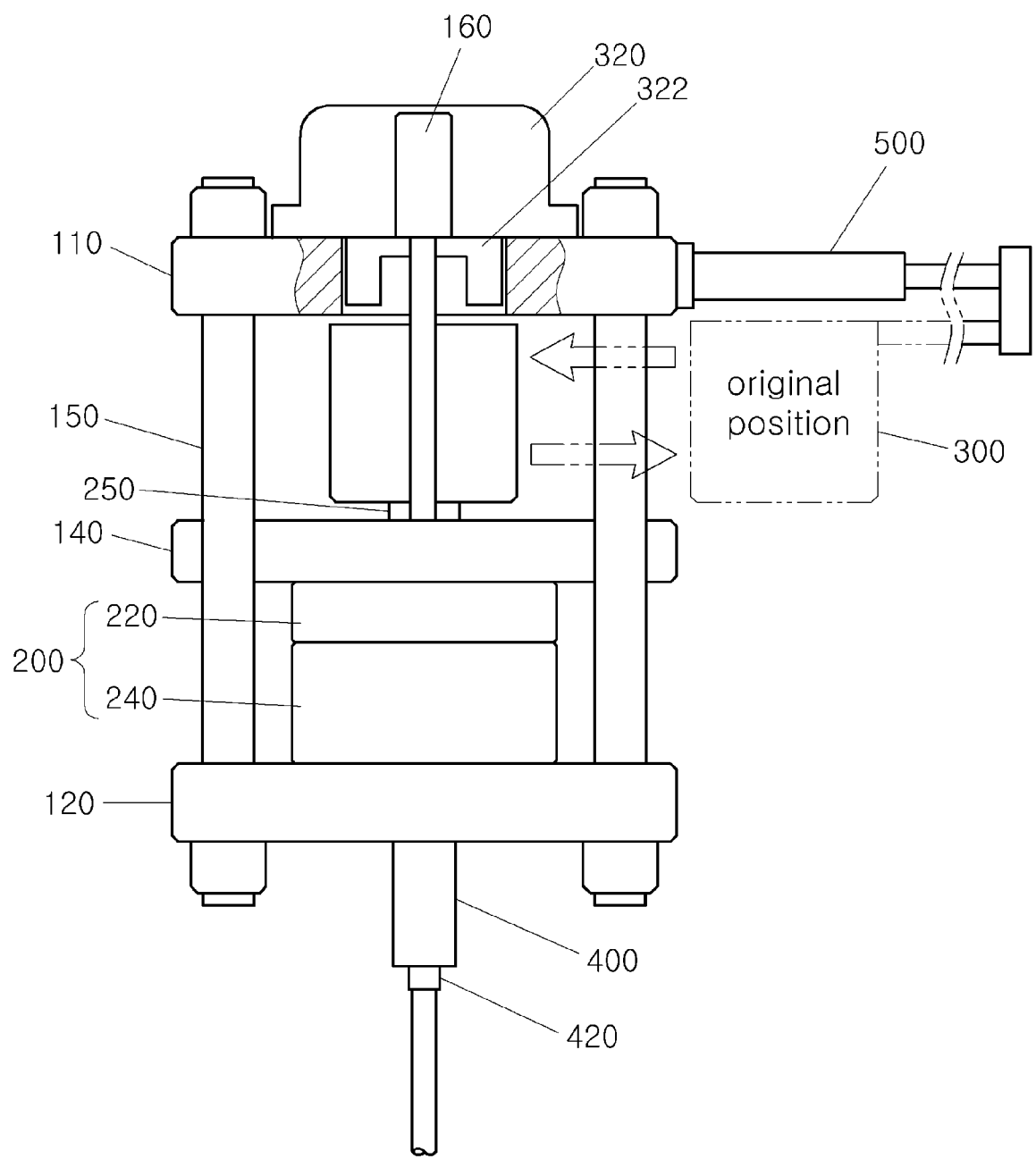
FIG. 2 is an exemplary view illustrating a side configuration of the die casting apparatus according to an embodiment of the present disclosure.
Figure 3:
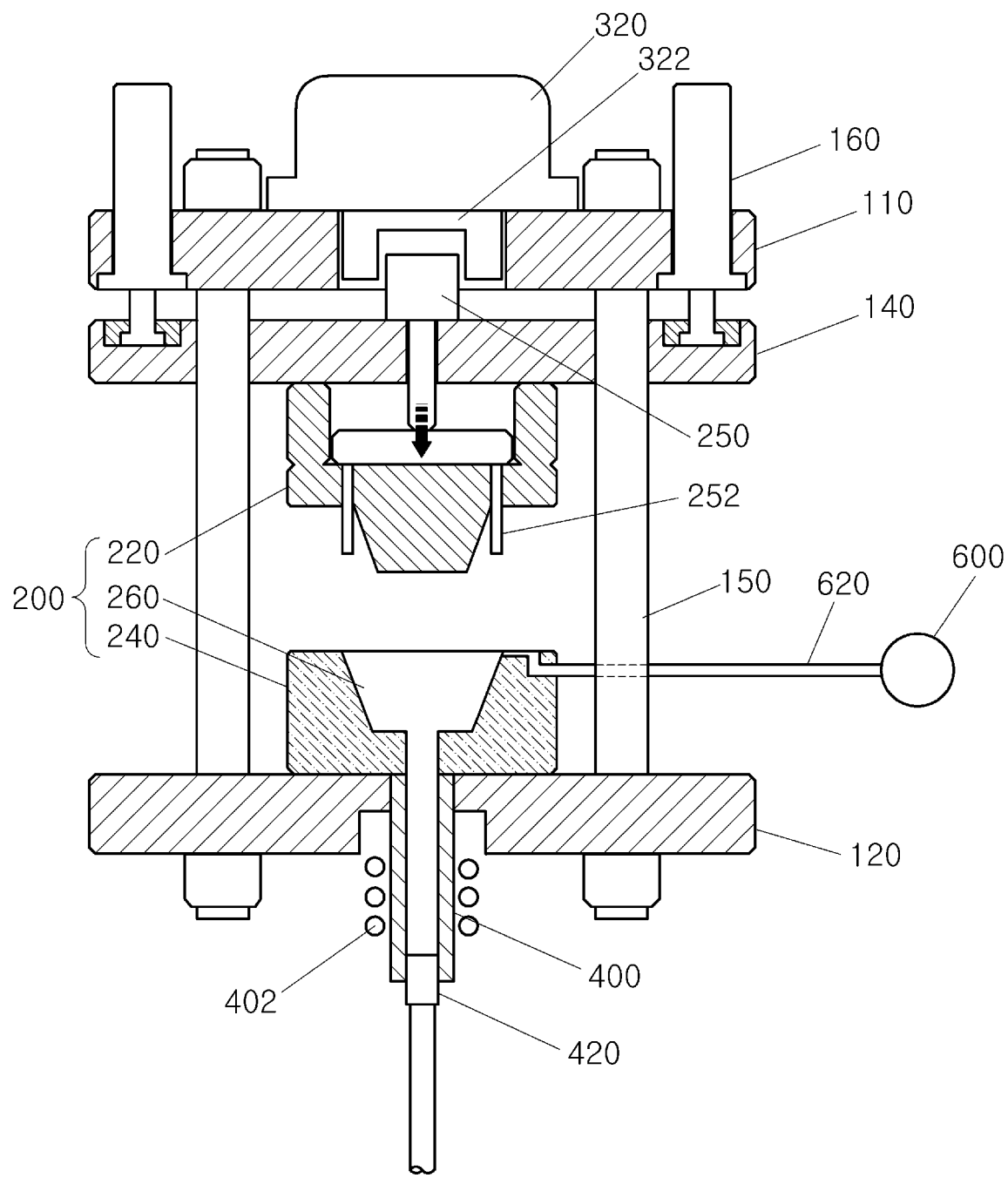
FIG. 3 is an exemplary view illustrating a state in which a molding space of the die casting apparatus according to an embodiment of the present disclosure is open.

FIG. 1 is an exemplary view illustrating a front configuration of a die casting apparatus according to an embodiment of the present disclosure, FIG. 2 is an exemplary view illustrating a side configuration of the die casting apparatus according to an embodiment of the present disclosure, and FIG. 3 is an exemplary view illustrating a state in which a molding space of the die casting apparatus according to an embodiment of the present disclosure is open.

As illustrated in the drawings, the die casting apparatus according to an embodiment of the present disclosure includes first and second fixed platens 110 and 120, a movable platen 140 disposed between the first and second fixed platens 110 and 120, a mold 200 in which a molding space 260 is formed, and a pressing block 300 capable of applying a pressure to the mold 200.

The first and second fixed platens 110 and 120 form plates having predetermined areas and predetermined thickness, and are disposed such that a predetermined distance from each other is formed by a plurality of tie bars 150 that is formed in a rod shape. In a state in which the distance between the first and second fixed platens 110 and 120 is maintained, the first and second fixed platens 110 and 120 are rigidly fixed such that the first and second fixed platens 110 and 120 are not moved.

The movable platen 140 is formed in a plate shape having a predetermined area and a predetermined thickness, and is formed such that the movable platen 140 is capable of being moved between the first and second fixed platens 110 and 120 along the tie bars 150. The movable platen 140 may be moved by a hydraulic cylinder. For example, the hydraulic cylinder may be a mold opening and closing cylinder 160 mounted at the first fixed platen 110. In this configuration, a plurality of mold opening and closing cylinders 160 is provided, and respective rods pulled out or pushed into the plurality of mold opening and closing cylinders 160 are connected to borders of the movable platen 140. Therefore, when the rods are pulled out or pushed into the mold opening and closing cylinders 160, the movable platen 140 is moved forward or backward along the tie bars 150.

Here, the mold opening and closing cylinders 160 may have a low pressure and a high speed comparing to a pressing cylinder 320 that is a pressing means which will be described later, so that a mold opening and closing time may be shortened.

The mold 200 includes a movable mold 220 and a fixed mold 240. The molding space 260 (cavity) is formed in surfaces where the movable mold 220 and the fixed mold 240 are in contact with each other. Therefore, when the movable mold 220 and the fixed mold 240 are coupled to each other, the molding space 260 is sealed, so that a material may be molded by injecting the material into the molding space 260. When a plurality of molding spaces 260 is required, the plurality of molding spaces 260 may be simultaneously formed in one mold 200.

Sealing of the molding space 260 may be realized by mounting a packing at each splayed point or at each point into which air can be introduced. Further, the molding space 260 is connected to an exhaust pipe 620, so that a vacuum state of the molding space 260 may be formed by suctioning air from the molding space 260 that is sealed.

A position of the movable mold 220 may be moved, and the fixed mold 240 may be formed such that the fixed mold 240 is in a fixed state on a predetermined position. To this end, the movable mold 220 may be formed on a surface of the movable platen 140, the surface facing the second fixed platen 120. Further, the fixed mold 240 may be formed on the second fixed platen 120. Therefore, when the movable platen 140 is moved while the fixed mold 240 is in the fixed state, the movable mold 220 is moved together with the movable platen 140 and is coupled to the fixed mold 240.

The pressing block 300 is a block formed in a predetermined size, and is selectively positioned between the first fixed platen 110 and the movable platen 140. The pressing block 300 may be positioned between the first fixed platen 110 and the movable platen 140 by moving the pressing block 300 only in a situation in which a pressure is required to be applied to the movable mold 220. Further, when the movable mold 220 and the fixed mold 240 are to be splayed apart, the fixing block 300 is returned to an original position. A plurality of pressing blocks 300 is provided. Further, in a process of molding a metal by using a mold apparatus according to the present disclosure, the plurality of pressing blocks 300 may be formed such that the plurality of pressing blocks 300 is selectively positioned between the first fixed platen 110 and the movable platen 140.

The pressing block 300 presses the movable platen 140 while moving forward to the movable mold 220 by an external force, thereby pressing the movable mold 220 as a result. In this situation, a pressing means is provided, and the pressing block 300 may be moved forward to the movable mold 220 by a pressure generated from the pressing means.

The pressing means may be the pressing cylinder 320 which is mounted at the first fixed platen 110 and which is formed such that a first ram 322 is capable of being pulled out or pushed into the t pressing cylinder 320. Conventionally, such a pressing cylinder 320 is a component adopted as a means for pressing the mold 200. According to the present disclosure, the pressing block 300 transfers a pressure generated from the pressing cylinder 320 to the movable mold 220. Therefore, a length of the pressing cylinder 320 and a length of the first ram 322 is provided as short as a length of the pressing block 300 comparing to a conventional configuration. Accordingly, in a process of pressing the movable mold 220, an operation time of the pressing cylinder 320 is reduced comparing to a conventional operation time, so that an overall process cycle of molding a molded article may be significantly reduced.

The pressing block 300 may be formed such that the pressing block 300 can be moved between the first fixed platen 110 and the mold 200 by an actuator 500. The actuator 500 may be mounted at a border of the first fixed platen 110, and is formed such that the actuator 500 pushes and moves the pressing block 300 to a desired position or returns the pressing block 300 to an original position.

Meanwhile, the die casting apparatus according to the present disclosure is provided with an ejector pin 252, so that a molded article may be released from the molding space 260. The ejector pin 252 is formed such that the ejector pin 252 penetrates the movable mold 220 and an end of the ejector pin 252 reaches the molding space 260, and the ejector pin 252 is operated and moved forward and backward by an ejector cylinder 250.

The ejector cylinder 250 is formed at the movable platen 140. The ejector cylinder 250 is formed on a surface opposite to a surface on which the movable platen 220 is formed. That is, the ejector cylinder 250 is formed on a surface facing the pressing block 300. Therefore, the ejector cylinder 250 protrudes in a direction facing the pressing block 300.

When the ejector cylinder 250 is formed, an accommodating space 302 in which the ejector cylinder 250 is accommodated is formed in the pressing block 300. Therefore, in a state in which the ejector cylinder 250 is accommodated in the accommodating space 302, the pressing block 300 may apply a pressure to the movable platen 140.

In the die casting apparatus according to the present disclosure, a sleeve 400 that is in communication with the molding space 260 is formed at the second fixed platen 120. Since the sleeve 400 is formed so that a material is injected into the molding space 260 through the sleeve 400, the sleeve 400 may be detachably mounted at the second fixed platen 120.

The sleeve 400 is provided with a pressing plunger 420. As such, the material inserted inside the sleeve 400 is pushed and injected into the molding space 260 by using the pressing plunger 420.

The sleeve 400 may have a heating means. The heating means may be a coil 402 generating a heat by using electricity. Further, the coil 402 is wound on the sleeve 400 and generates the heat, so that the material inserted inside the sleeve 400 may be molten or the material may maintain a molten state or a semi-molten state by maintaining a predetermined temperature.

In the die casting apparatus in which the present disclosure as described above is applied, the first fixed platen 110, the movable platen 140, the second fixed platen 120, and the sleeve 400 may be disposed in a vertical direction. Alternatively, the first fixed platen 110, the movable platen 140, the second fixed platen 120, and the sleeve 400 may be disposed in a horizontal direction or may be disposed to be in a state of being inclined at a predetermined angle.

Figure 4:
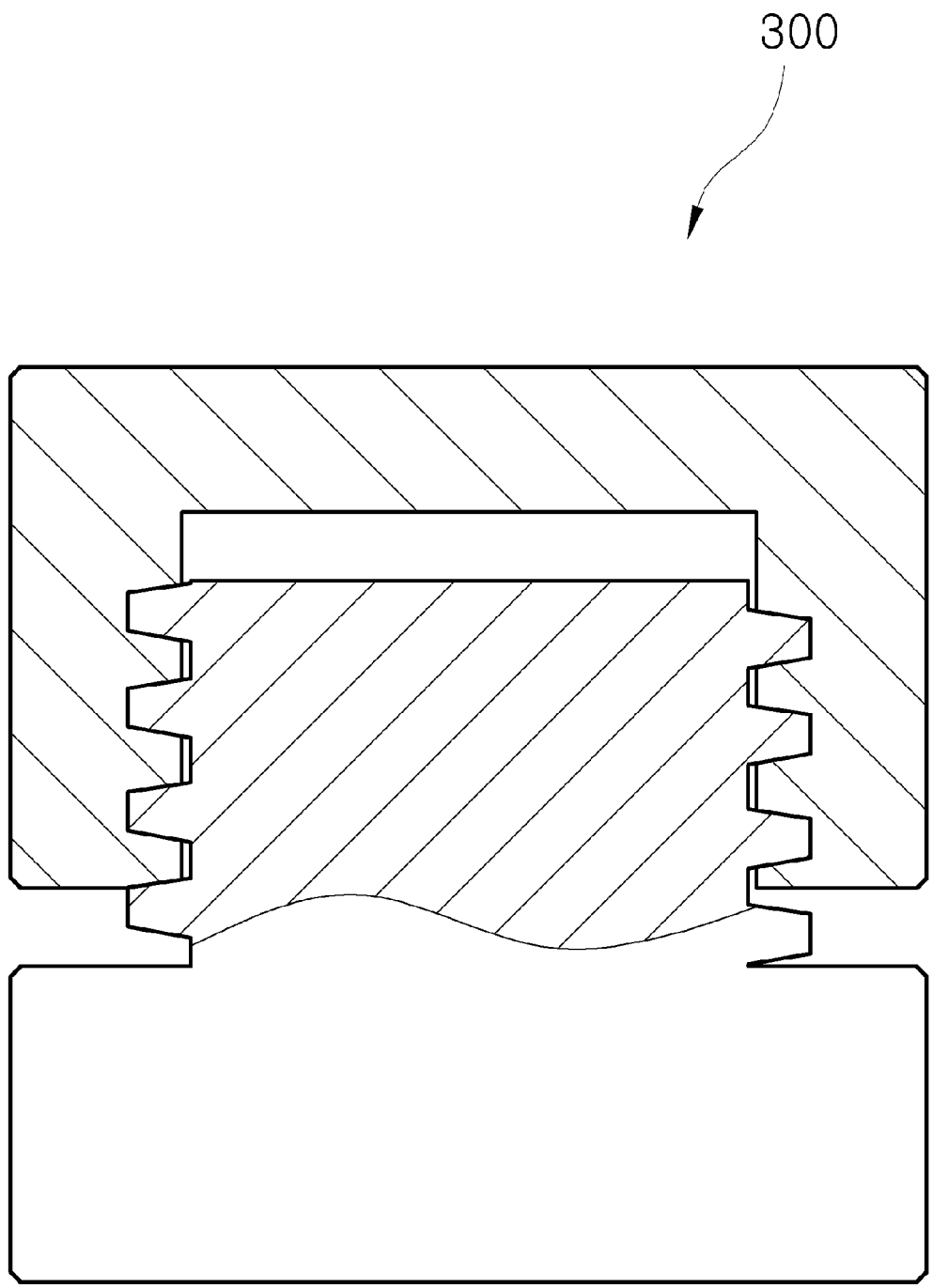
FIG. 4 is an exemplary view illustrating a structure in which a pressing block according to the present disclosure is formed such that a length of the pressing block is capable of being adjusted.

FIG. 4 is an exemplary view illustrating a structure in which a pressing block according to the present disclosure is formed such that a length of the pressing block is capable of being adjusted.

The pressing block 300 may be formed such that a length of the pressing block 300 is capable of being adjusted. By realizing a structure in which a body of the pressing block 300 is divided into two parts and the two parts are screwed to each other, the length of the pressing block 300 is capable of being adjusted. Among the two divided parts, one part has a female thread and other part has a male thread, so that a structure in which the two divided parts are coupled to each other is formed. Accordingly, the length of the pressing block 300 may be adjusted and used when the length of the pressing block 300 is required to be adjusted.

Figure 5:
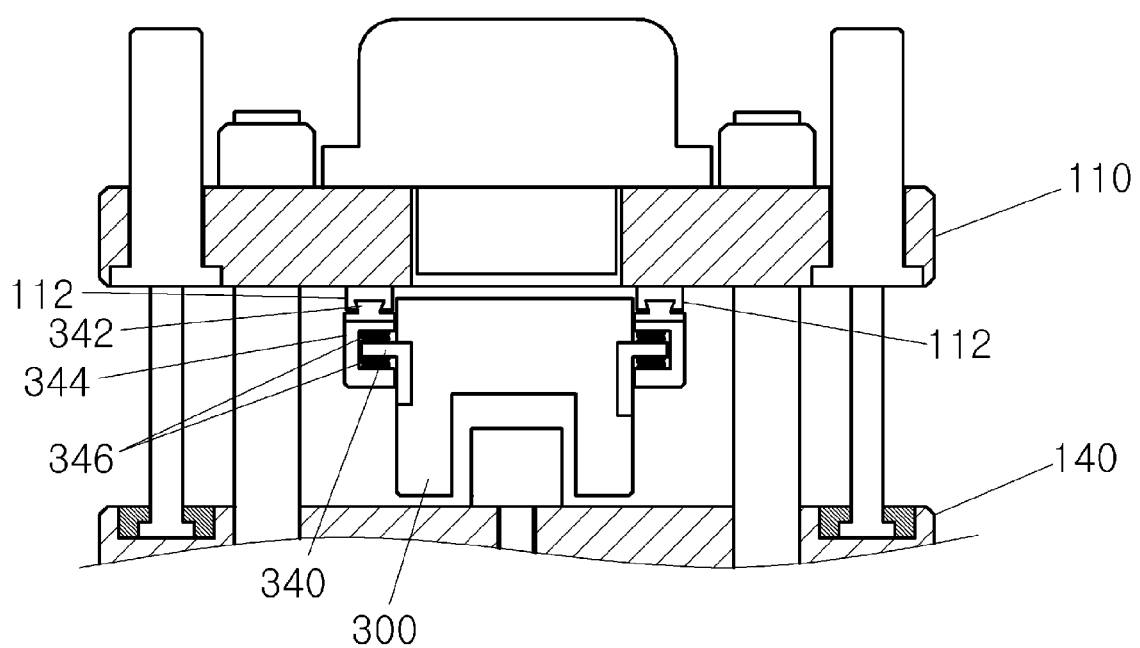
FIG. 5 is an exemplary view illustrating a structure in which a position of the pressing block according to the present disclosure is moved along rails.

FIG. 5 is an exemplary view illustrating a structure in which a position of the pressing block according to the present disclosure is moved along rails.

The pressing block 300 according to the present disclosure may be formed such that the pressing block 300 is moved along a rail 112 that is formed on the first fixed platen 110. The rail 112 is formed on a surface of the first fixed platen 110, the surface facing the movable platen 140. Preferably, a pair of rails 112 is formed. In this configuration, the pressing block 300 has slide guides 342 which correspond to the rails 112 and which are formed on a left side and a right side of the pressing block 300. Further, in a state in which the slide guides 342 are coupled to the rails 112, a position of the pressing block 300 is moved by pushing or pulling the pressing block 300. At this time, in order for a smooth movement of the pressing block 300, the pressing block 300 is required to maintain a predetermined distance from the first fixed platen 110. Therefore, in order to maintain the predetermined distance, sizes of the rails 112 and the slide guides 342 are required to be determined.

Meanwhile, in the configuration as described above, the pressing block 300 is formed such that the pressing block 300 is capable of being elastically reciprocated while being coupled to the rails 112. This configuration can be realized by support brackets 340 that protrude on opposite side surfaces of the pressing block 300, spring brackets 344 which are formed in U-shapes having entrances open toward the pressing block 300 and which are formed below the slide guides 342, and springs 346 supporting the support brackets 340 while the support brackets 340 are fitted into the spring brackets 344. The springs 346 support the support brackets 340 on opposite sides.

Accordingly, in a state in which the pressing block 300 is positioned between the first fixed platen 110 and the movable platen 140, when the pressing block 300 is pushed by an external force, one spring 346 supporting a first surface contracts but other spring 346 supporting a second surface expands and moves forward. Further, when the external force that pushes the pressing block 300 is released, the other spring 346 supporting the second surface contracts and the one spring 346 supporting the first surface expands and moves backward to an original position.

Figure 6:
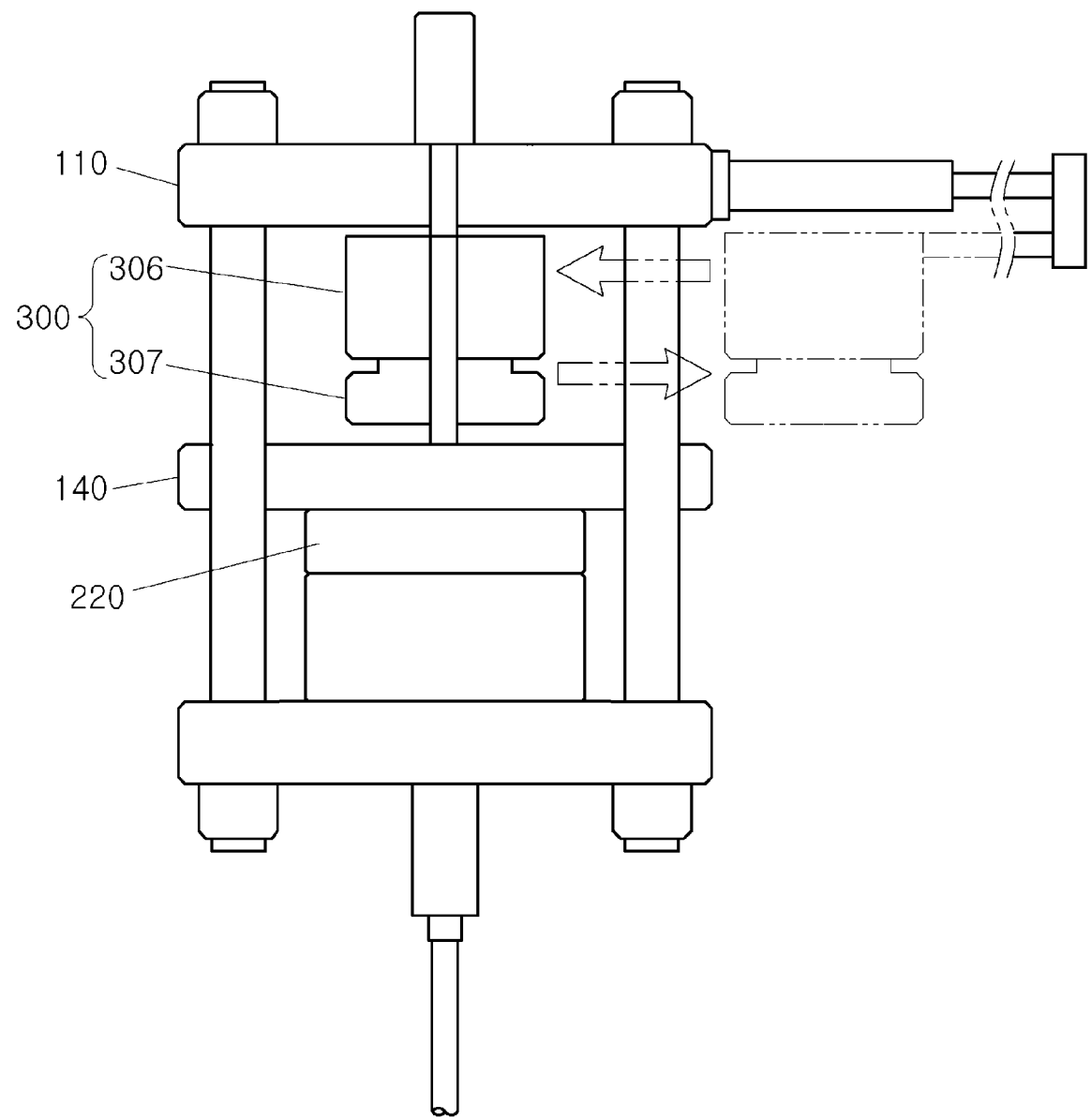
FIG. 6 is an exemplary view illustrating a structure in which the pressing block according to the present disclosure is formed such that the pressing block is capable of applying a pressure to a mold by using its own force.

FIG. 6 is an exemplary view illustrating a structure in which the pressing block according to the present disclosure is formed such that the pressing block is capable of applying a pressure to a mold by using its own force.

As illustrated in the drawing, the pressing block 300 according to the present disclosure may be formed of a block cylinder 306 that is provided with a second ram 307. In this configuration, the pressing block 300 generates a pressure by using its own force without a pressing means separately provided, thereby applying the pressure to the movable platen 140. That is, in a state in which the block cylinder 306 operated by a hydraulic pressure is supported on the first fixed platen 110 and is operated, the second ram 307 protrudes and the pressure is applied to the movable platen 140, thereby pressing the movable mold 220.

Figure 7:
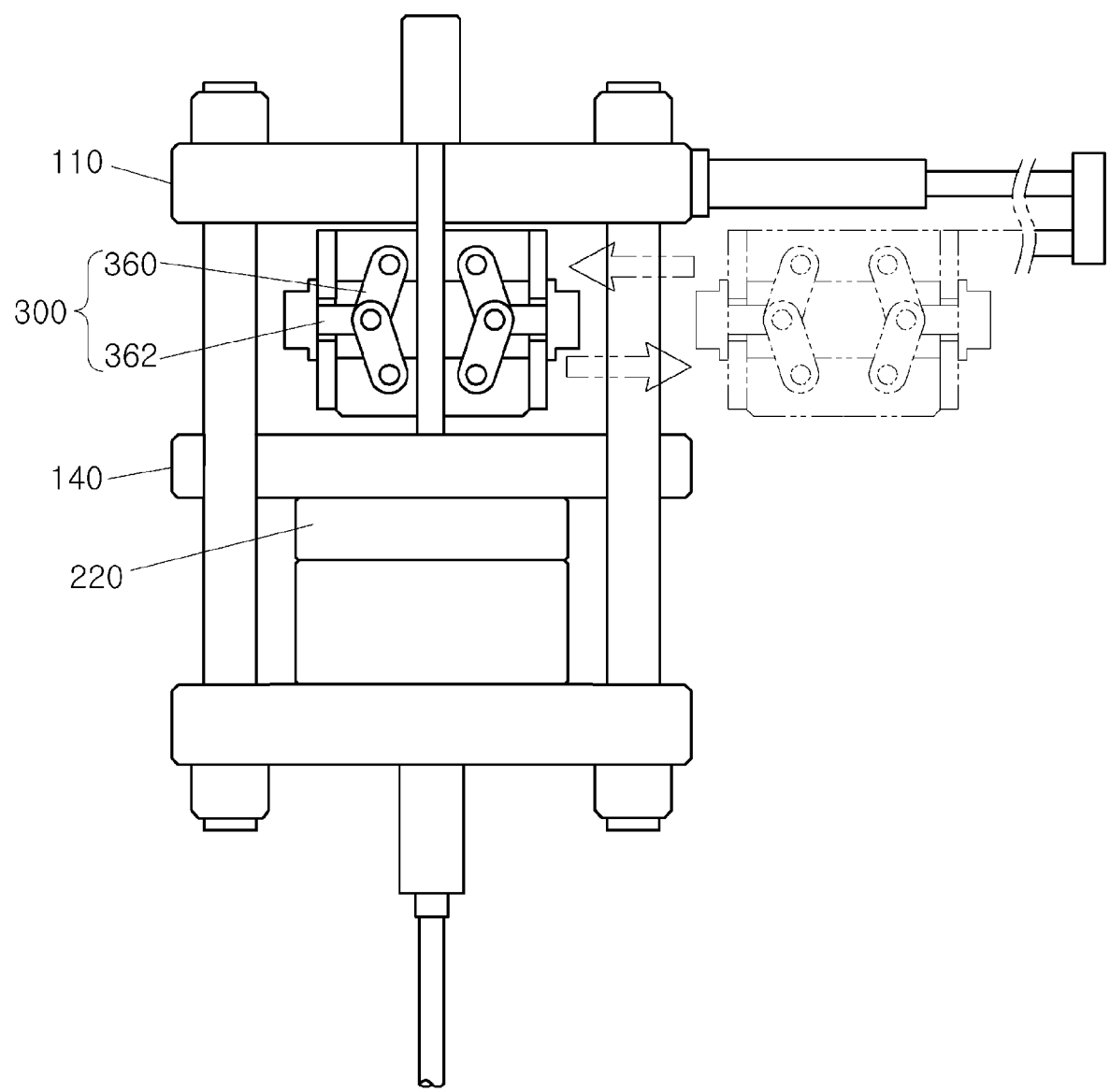
FIG. 7 is an exemplary view illustrating another embodiment in which the pressing block according to the present disclosure is formed such that the pressing block is capable of applying a pressure to the mold by using its own force.

FIG. 7 is an exemplary view illustrating another embodiment in which the pressing block according to the present disclosure is formed such that the pressing block is capable of applying a pressure to the mold by using its own force.

As illustrated in the drawing, the pressing block 300 according to the present disclosure may be configured to generate a pressure by using its own force by having toggle links 360. In this situation, the pressing block 300 is divided into two parts, and the toggle links 360 are mounted at divided points and the two parts are connected with each other. As known, the toggle links 360 are configured such that two links are connected to each other by a shaft, and are capable of being folded or unfolded. In the present disclosure, the shaft to which the two links are connected is provided with a toggle actuating rod 362. Further, when the toggle actuating rod 362 is moved forward or backward by a hydraulic cylinder, the toggle links 360 are unfolded or folded. Therefore, in a state in which the pressing block 300 according to another embodiment is supported on the first fixed platen 110, when the toggle links 360 are unfolded, a length of the pressing block 300 is increased and the movable mold 220 is pressed. In contrast, when the toggle links 360 are folded, the length of the pressing block 300 is decreased, so that a force pressing the movable mold 220 is released.

Figure 8:
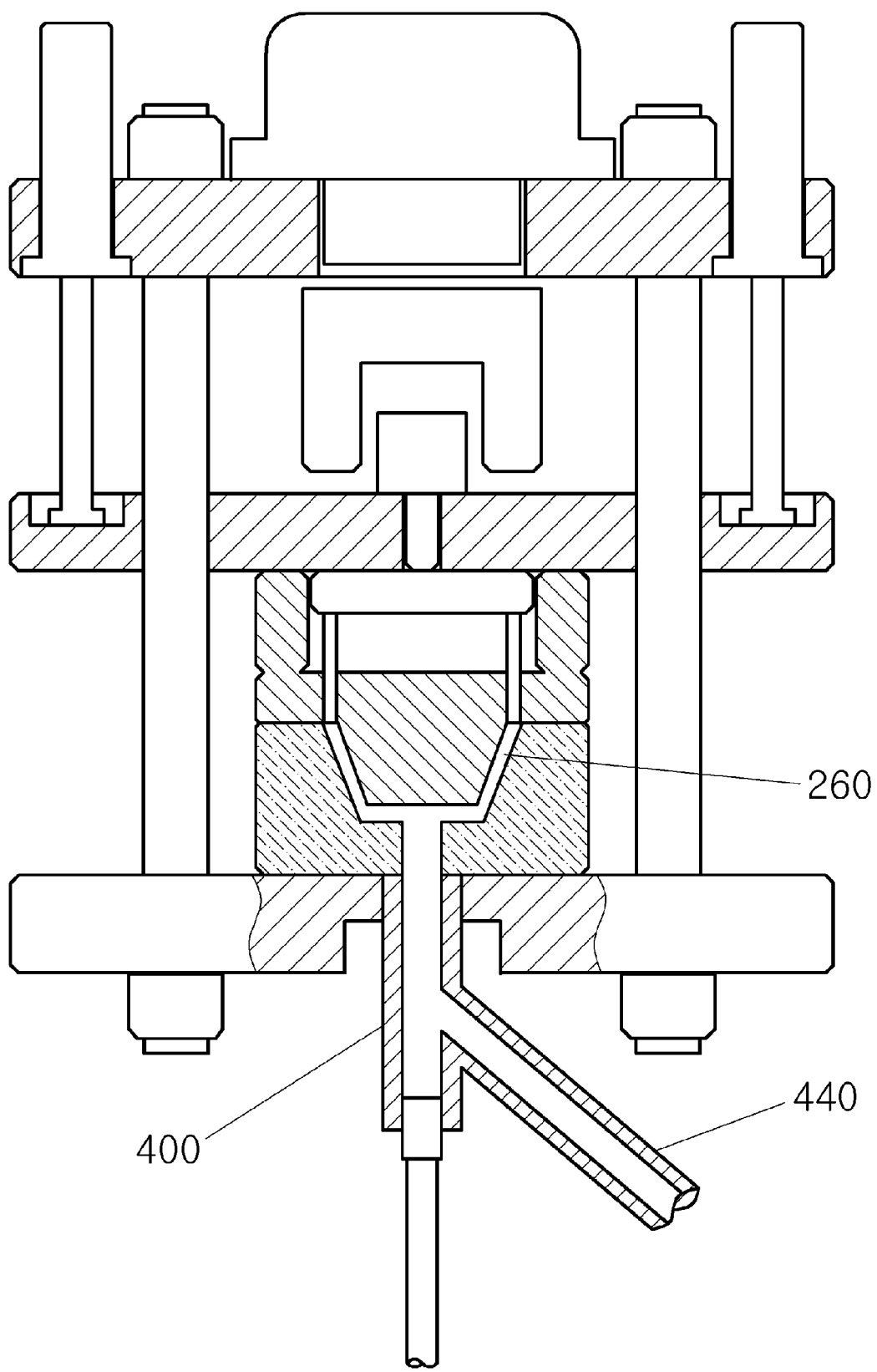
FIGS. 8 to 10 are exemplary views illustrating structures in which a material is injected into the molding space of an apparatus for molding a material according to the present disclosure.
Figure 9:
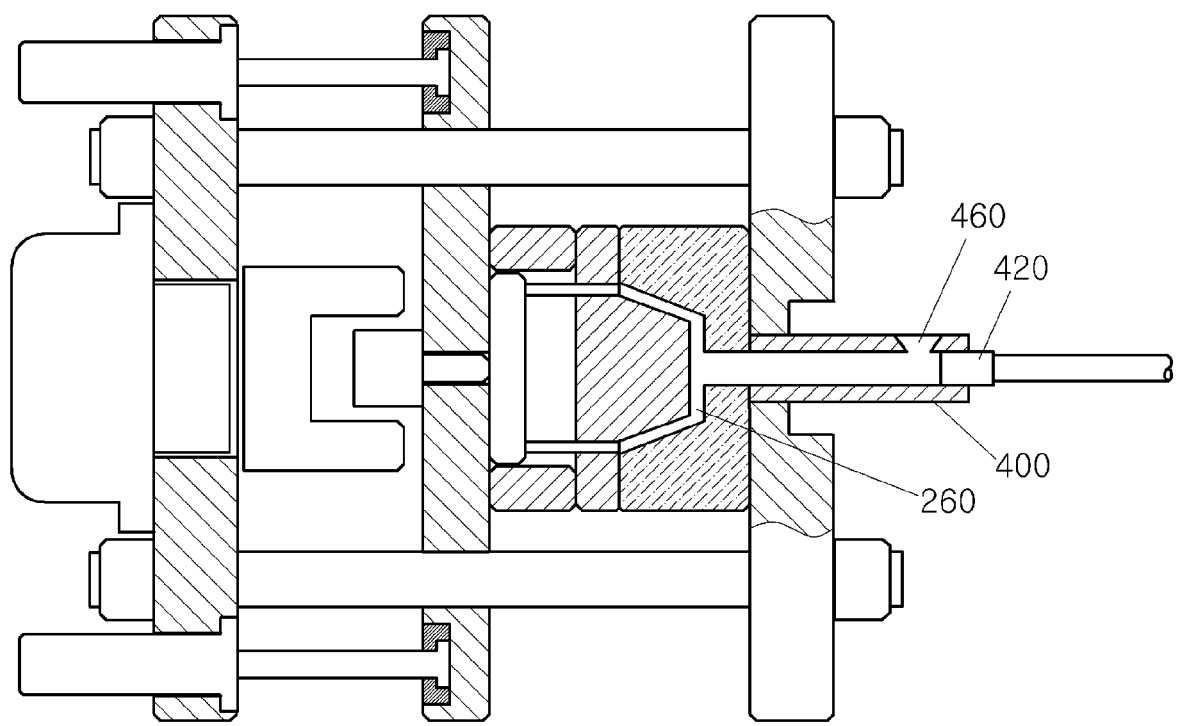
Figure 10:
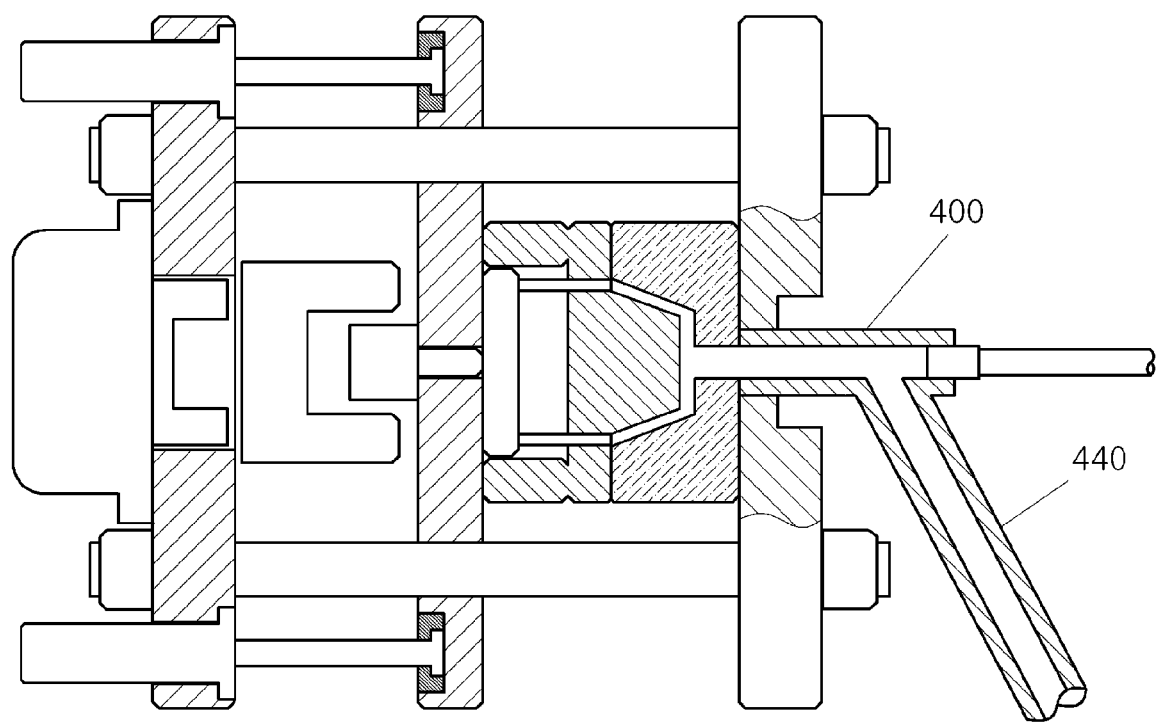

FIGS. 8 to 10 are exemplary views illustrating structures in which a material is injected into the molding space of an apparatus for molding a material according to the present disclosure.

As illustrated in the drawings, an apparatus for molding a metal according to the present disclosure may variously realize a structure in which a material is inserted into the molding space 260.

In FIG. 8, a structure in which the sleeve 400 is formed in a vertical direction and a runner pipe 440 is formed such that the runner pipe 440 is in communication with the sleeve 400 is illustrated. In this configuration, a material in a liquid state (hereinafter, referred to as 'a molten metal') is capable of being injected into the sleeve 400 through the runner pipe 440.

In FIG. 9, a structure in which the sleeve 400 is formed in a horizontal direction and a molten metal injection port 460 is formed at an upper portion of the sleeve 400 is illustrated. In this configuration, a molten metal is poured into the molten metal injection port 460 and is injected into the sleeve 400, and the molten metal is capable of being injected into the molding space 260 by pushing the molten metal with the pressing plunger 420.

In FIG. 10, a structure in which the sleeve 400 is formed in the horizontal direction and the runner pipe 440 is formed at a lower portion of the sleeve 400 is illustrated. In this configuration, a molten metal is injected into the sleeve 400 through the runner pipe 440.

In the die casting apparatus according to the present disclosure as described above, after a material is injected into the sleeve 400, the material is molded by performing a forming process (S1) in which the molding space 260 is formed inside the mold 200 by coupling the movable mold 220 and the fixed mold 240, a positioning process (S2) in which the pressing block 300 is moved from an original position to a point where the pressing block 300 is capable of applying a pressure to the mold 200, a pressing process (S3) in which the pressing block 300 is moved forward to the mold 200 and applies the pressure so that the movable mold 220 and the fixed mold 240 are not splayed apart, a molding process (S4) in which the material injected into the sleeve 400 is injected into the molding space 260 inside the mold 200 and then is molded, a returning process (S5) in which the pressing block 300 is returned to the original position, and a releasing process (S6) in which the movable mold 220 and the fixed mold 240 are splayed apart and a molded article is released from the molding space 260.

In the forming process (S1), the movable platen 140 is moved forward to the fixed mold 240 while the fixed mold 240 is in a state of being fixed to the second fixed platen 120. By operating the mold opening and closing cylinders 160 mounted at the first fixed platen 110, the movable platen 140 is moved forward along the tie bars 150. Accordingly, the movable mold 220 formed on the movable platen 140 is moved toward the fixed mold 240 and is coupled to the fixed mold 240.

In the positioning process (S2), the pressing block 300 is moved by lifting up the pressing block 300 with a separate apparatus. Otherwise, when the actuator 500 is provided, the pressing block 300 is moved to a point between the first fixed platen 110 and the movable platen 140 by operating the actuator 500, in which the point is a position where the pressing block 300 is capable of applying a pressure to the mold 200.

In the pressing process (S3), when a configuration in which a pressing means formed at the first fixed platen 110 applies a pressure to the pressing block 300 or the pressing block 300 is capable of generating a pressure from the pressing block 300 is provided, the movable platen 140 is pushed by generating a pressure while a rear portion of the pressing block 300 is supported on the first fixed platen 110. As an example of the configuration corresponding to the latter, there is the pressing block 300 which is formed of the block cylinder 306 that has the second ram 307 as described above, so that the block cylinder 306 is operated and the second ram 307 pushes the movable platen 140, thereby applying a pressure to the movable mold 220.

In the molding process (S4), in a state in which the pressure is applied by using the pressing block 300, the material is pushed and injected into the molding space 260 by using the pressing plunger 420 that is formed at the sleeve 400. At this time, the material injected into the sleeve 400 may be injected into the sleeve 400 while being in a molten metal state, or may be formed to be in the molten metal state by heating and melting the material from the sleeve 400.

After the molding process (S4), when the molten metal is left for a predetermined amount of time, the molten metal injected into the molding space 260 is solidified.

Meanwhile, in the molding process (S4), the molten metal is injected into the molding space 260 by pushing the molten metal with a strong pressure with the pressing plunger 420. Therefore, the strong pressure is applied to the movable mold 220. At this time, since the pressing block 300 pushes the movable mold 220 with a strong force, the movable mold 220 is supported such that the movable mold 220 is not splayed apart from the fixed mold 240.

In the returning process (S5), the pressing block 300 is moved to the original position. By spacing the pressing block 300 apart from the movable platen 140, the pressure applied to the movable mold 220 is released. When the pressing cylinder 320 is provided as the pressing means, the pressing block 300 is spaced apart from the movable platen 140 by moving the first ram 322 backward. After then, the pressing block 300 positioned between the first fixed platen 110 and the movable platen 140 is returned to the original position.

In the releasing process (S6), by returning the movable mold 220 to the original position, the movable mold 220 and the fixed mold 240 are splayed apart. Since the movable platen 140 is moved backward by operating the mold opening and closing cylinders 160, the molded article may be released from the molding space 260. In this process, by moving the ejector pin 252 forward to the molding space 260, the molded article may be detached from the movable mold 220.

Here, after the forming process (S1), the vacuum state may be formed by suctioning air from the molding space 260. Further, air is suctioned through the exhaust pipe 620 connected to the molding space 260. As a result, the material is molded while the vacuum state is maintained inside the molding space 260. As such, when the vacuum state is formed inside the molding space 260, the molten metal is prevented from being oxidized during a process of molding the metal material. Therefore, a molded article having high quality may be manufactured.

FIGS. 11 to 22 are views illustrating examples in which the present disclosure is applied to a forging apparatus. Hereinbelow, descriptions of the configurations having the same or similar functions as those of the apparatus described above with reference to FIGS. 1 to 10 will be omitted, and different configurations will be mainly described.

Figure 11:
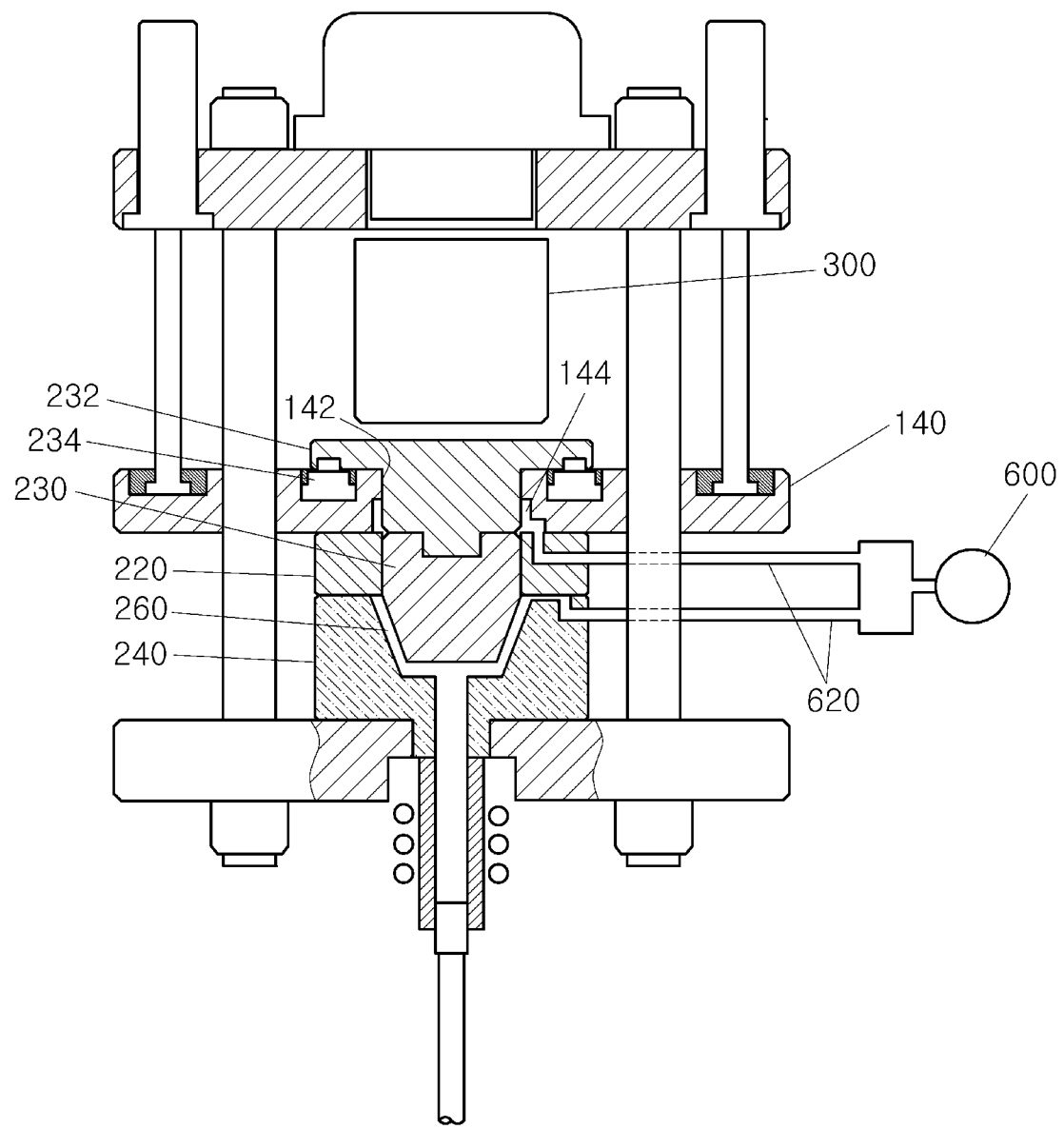
FIG. 11 is an exemplary view illustrating an example of a forging apparatus to which the present disclosure is applied.

FIG. 11 is an exemplary view illustrating an example of a forging apparatus to which the present disclosure is applied.

As illustrated in the drawing, the pressing block 300 according to the present disclosure may be applied to a forging apparatus having a punch 230. Conventionally, the forging apparatus is used for molding a metal material.

The punch 230 is formed such that an end of the punch 230 penetrates the movable mold 220 and reaches the molding space 260. Since the movable mold 220 is formed on the surface of the movable platen 140, the surface facing the fixed mold 240, the punch 230 sequentially penetrates the movable platen 140 and the movable mold 220, and the end of the punch 230 reaches the molding space 260. This structure is a structure in which the molding space 260 is formed in a space that is formed between the end of the punch 230 and the fixed mold 240.

The punch 230 may be configured to be moved forward or backward by a punch cylinder 234. A punch support 232 having a cross-sectional area wider than a cross-sectional area of the punch 230 is provided at a rear end of the punch 230, and the punch cylinder 234 is mounted between the movable platen 140 and the punch support 232, so that the punch 230 may be formed such that the punch 230 is capable of being moved forward or backward according to an operation of the punch cylinder 234.

Accordingly, by moving the punch 230 forward after the punch 230 is moved backward to a predetermined level, the material which is in the molten metal state or the semi-molten metal state and which is injected into the molding space 260 may be punched with a high pressure that is applied by the pressing block 300. As a result, a molded article may be molded by applying a forging manner.

In the configuration as described above, the punch 230 penetrates a through hole 142 formed in the movable platen 140. At this time, in an entrance of the through hole 142 and the molding space 260, packings are mounted at points into which air is capable of being introduced, so that the entrance of the through hole 142 and the molding space 260 are sealed. The packings are formed so as to block an introduction of external air, thereby preventing the molten metal from being oxidized. In this configuration, a groove is formed inside the through hole 142 and a rear space 144 is formed, and the exhaust pipes 620 are respectively connected to the rear space 144 and to the molding space 260, thereby being capable of simultaneously suctioning air from two points to which the exhaust pipes 620 are connected. As such, by simultaneously suctioning air, the high vacuum state is rapidly formed inside the apparatus including the molding space 260.

Meanwhile, in the rear space 144, impurities such as fine debris generated when the molten metal injected into the molding space 260 is molded during a process in which the punch 230 is reciprocated may be introduced into the rear space 144 through a gap between the punch 230 and the through hole 142 and may be collected. However, when air is suctioned simultaneously from the rear space 144 and the molding space 260 as described above, the impurities introduced into the rear space 144 are not introduced into the molding space 260 again, so that an introduction of the impurities during the process of molding the molten metal may be prevented.

FIGS. 12 to 15 are exemplary views illustrating a process of molding a material by using the forging apparatus according to an example of the present disclosure.

In the forging apparatus according to the present disclosure as described above, after a material is injected into the sleeve 400, the material is molded by performing a forming process (S1) in which the molding space 260 is formed inside the mold 200 by coupling the fixed mold 240 to the movable mold 220 in which the punch 230 is formed, a positioning process (S2) in which the pressing block 300 is moved from an original position to a point where the pressing block 300 is capable of applying a pressure to the mold 200, an injecting process (S3) in which the material injected into the sleeve 400 is injected into the molding space 260, a punching process (S4) in which a pressure is applied by moving the pressing block 300 forward to the mold 200 so that the pressure is applied to the punch 230 and the material injected into the molding space 260 is punched, a returning process (S5) in which the pressing block 300 is returned to the original position, and a releasing process (S6) in which the movable mold 220 and the fixed mold 240 are splayed apart and a molded article is released from the molding space 260.

As a method of injecting a material into the sleeve 400, there is a method of injecting a material into the sleeve 400, the method being performed by injecting the material into the sleeve 400 through the molding space 260 after the movable platen 140 is moved backward and then the movable mold 220 is moved backward so that the molding space 260 is open. However, the method is not limited thereto, and the material may be injected into the sleeve 400 by using the method described with reference to FIGS. 8 to 10. When the material is injected into the sleeve 400, the material is molten by operating the heating means, and the material may be formed in the molten metal or may maintain the semi-molten metal state.

Figure 12:
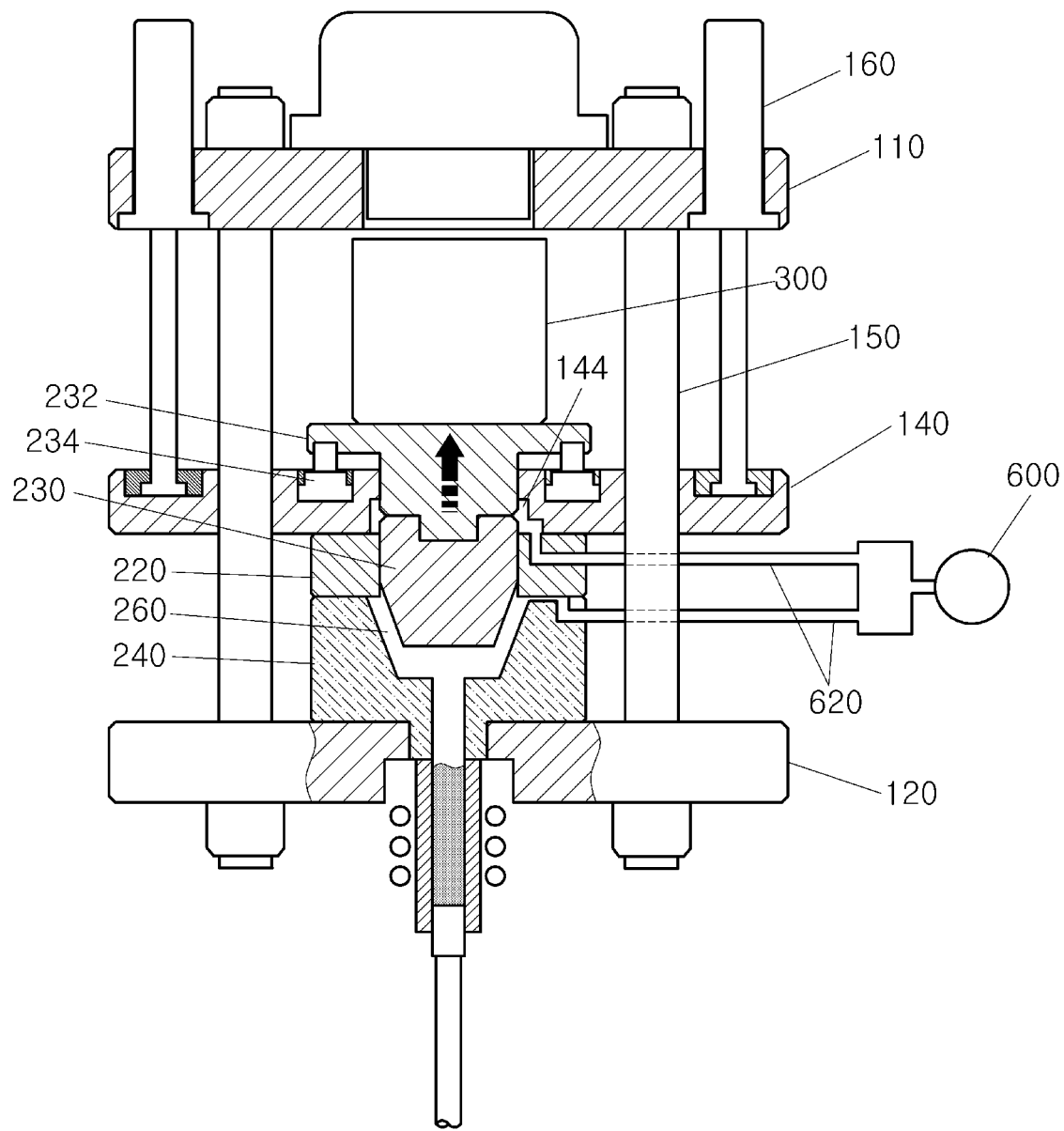
FIGS. 12 to 15 are exemplary views illustrating a process of molding a material by using the forging apparatus according to an example of the present disclosure.

In the forming process (S1), after the injection of the material is finished, the movable platen 140 is moved forward while the fixed mold 240 is in the state of being fixed to the second fixed platen 120, so that the movable mold 220 formed on the movable platen 140 is pushed toward the fixed mold 240 and is coupled to the fixed mold 240, thereby forming the molding space 260 inside the mold 200. By operating the mold opening and closing cylinders 160 mounted at the first fixed platen 110, the movable platen 140 is moved forward along the tie bars 150. Here, by operating an exhaust apparatus 600 after the forming process (S1), air may be simultaneously suctioned from the molding space 260 and the rear space 144 that is formed in the through hole 142. By simultaneously suctioning air through the exhaust pipes 620 that are respectively connected to the rear space 144 and the molding space 260, the vacuum state is formed inside the molding space 260 (FIG. 12).

In the positioning process (S2), the pressing block 300 is moved by lifting up the pressing block 300 with a separate apparatus. Otherwise, when an actuator is provided, the pressing block 300 is moved to a point between the first fixed platen 110 and the movable platen 140 by operating the actuator, in which the point is a position where the pressing block 300 is capable of applying a pressure to the mold 200. When a selection of the position of the pressing block 300 is finished, the punch 230 is moved backward toward the pressing block 300 to a predetermined amount of level. The punch 230 is moved backward by operating the punch cylinder 234.

Figure 13:
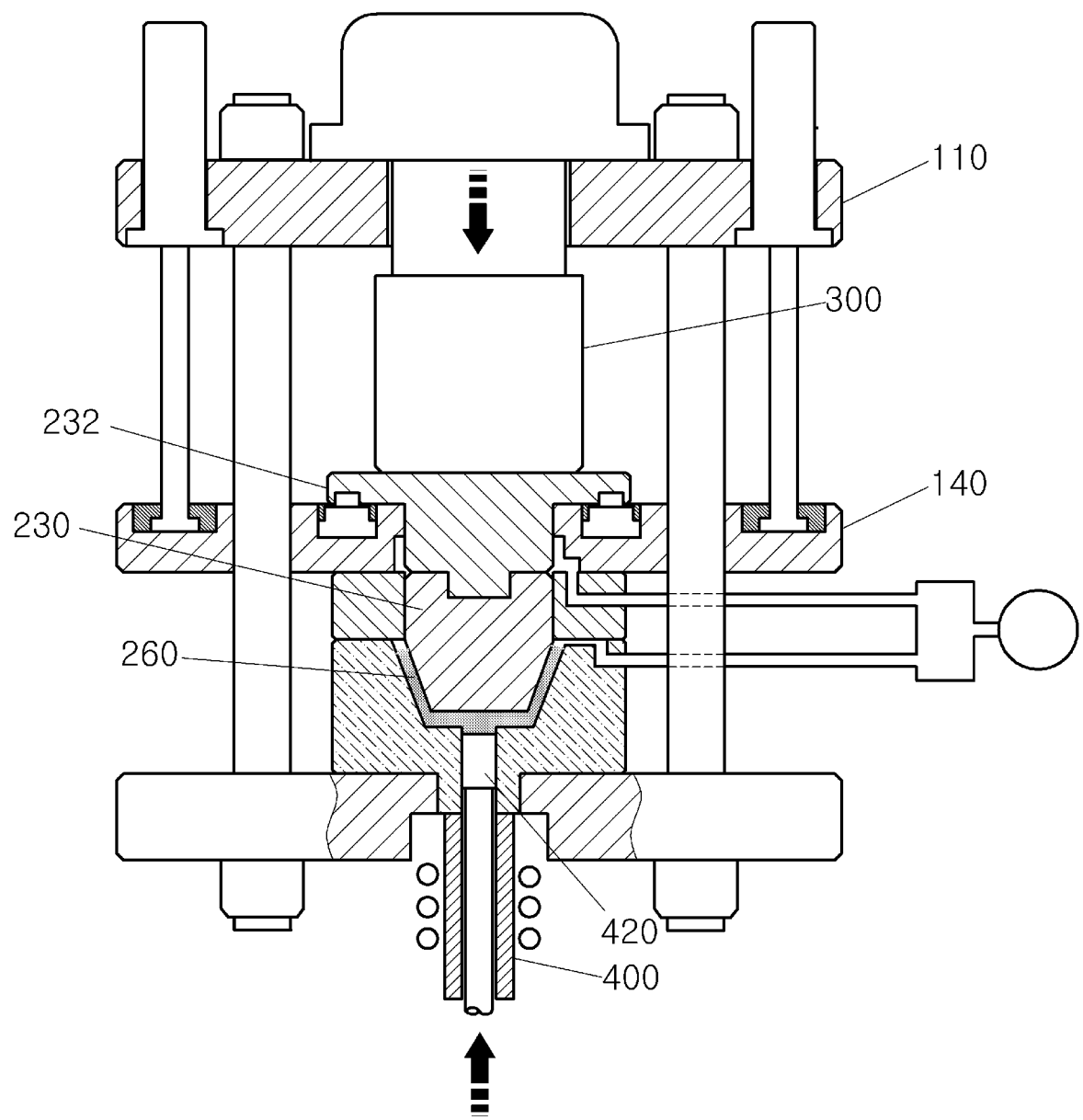
Figure 14:
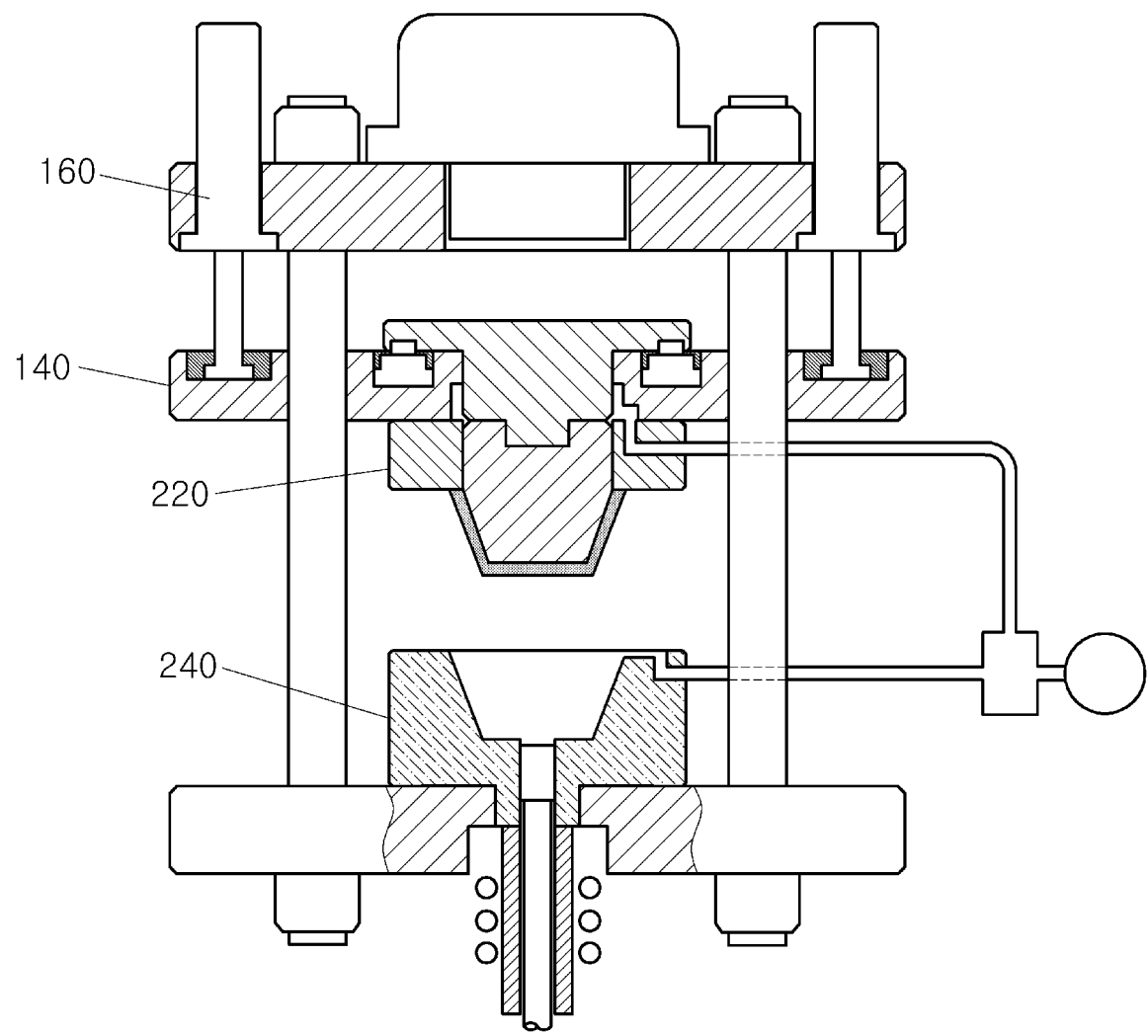

In the injecting process (S3), the material is pushed and injected into the molding space 260 by using the pressing plunger 420 that is formed at the sleeve 400. At this time, the material injected into the sleeve 400 may be in a molten metal state. Otherwise, the material may be in the molten metal state or the semi-molten metal state by heating and melting the material from the sleeve 400 (FIG. 13).

In the punching process (S4), the pressure is applied to the pressing block 300 by using the pressing means formed at the first fixed platen 110. Alternatively, when the pressing block 300 is configured such that the pressing block 300 is capable of generating a pressure from the pressing block 300, the pressing block 300 generates a pressure while a rear end of the pressing block 300 is in a state of being supported on the first fixed platen 110, so that the pressure is applied to the movable platen 140 and the punch support 232. Accordingly, the punch 230 moved backward also receives the pressure and is moved forward to the molding space 260, and the punch 230 punches the molten metal injected into the molding space 260, thereby performing forging molding. After the punching process (S4), when the molten metal is left for a predetermined amount of time, the molten metal injected into the molding space 260 is solidified (FIG. 13).

In the returning process (S5), the pressing block 300 is returned to the original position. By separating the pressing block 300 from the movable platen 140, the pressure applied to the movable mold 220 is released, and the pressing block 300 positioned between the first fixed platen 110 and the movable platen 140 is returned to the original position.

Figure 15:
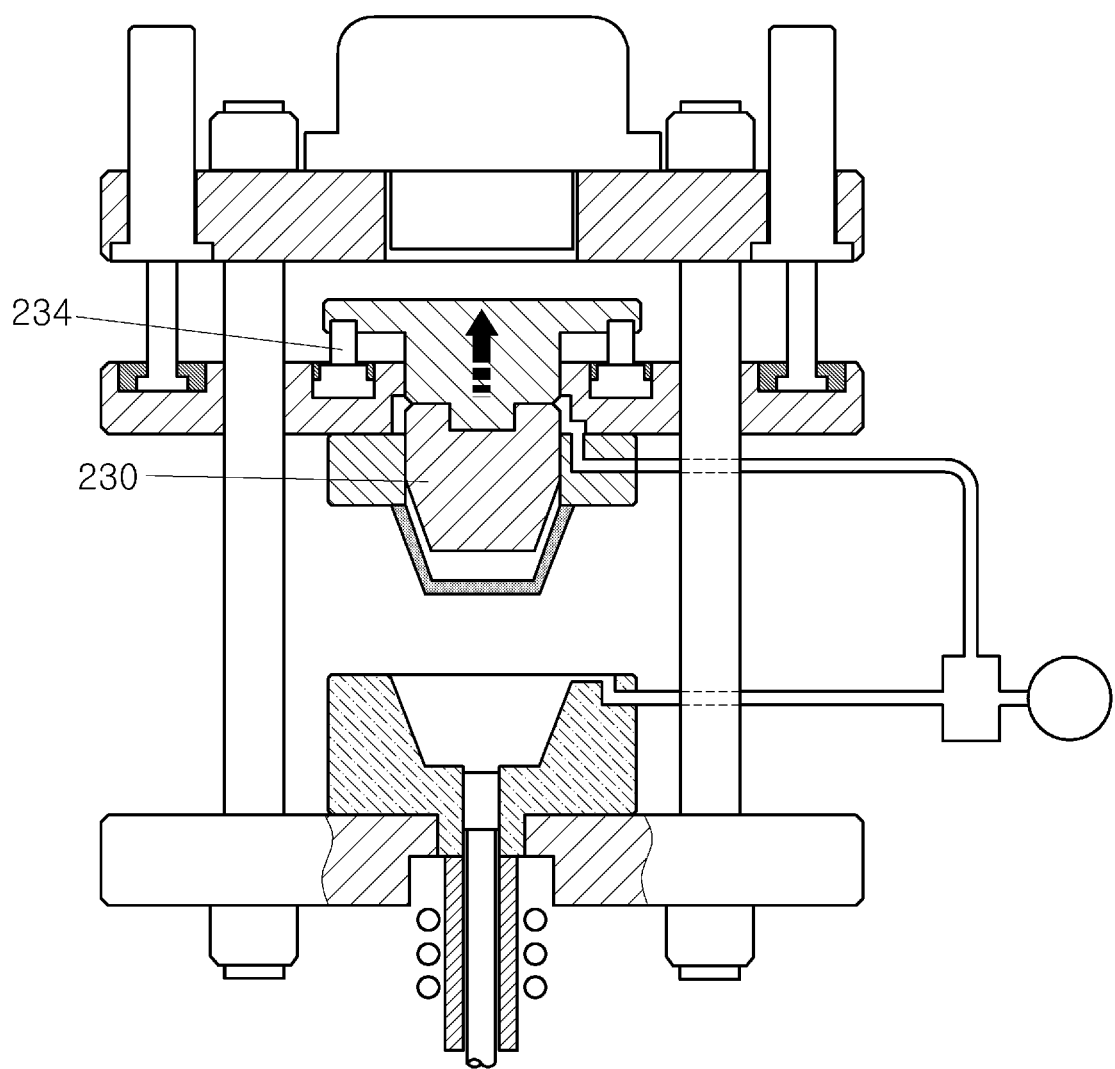

In the releasing process (S6), by moving the movable mold 220 backward, the movable mold 220 and the fixed mold 240 are splayed apart. By operating the mold opening and closing cylinders 160 so that the movable platen 140 is moved backward, the movable mold 220 is returned to the original position. Accordingly, the molded article is capable of being released. At this time, the molded article may be in a state of being attached to the end of the punch 230. In this situation, by operating the punch cylinder 234 so that the punch 230 is moved backward, the molded article attached to the end of the punch 230 is naturally detached and released (FIG. 15).

Figure 16:
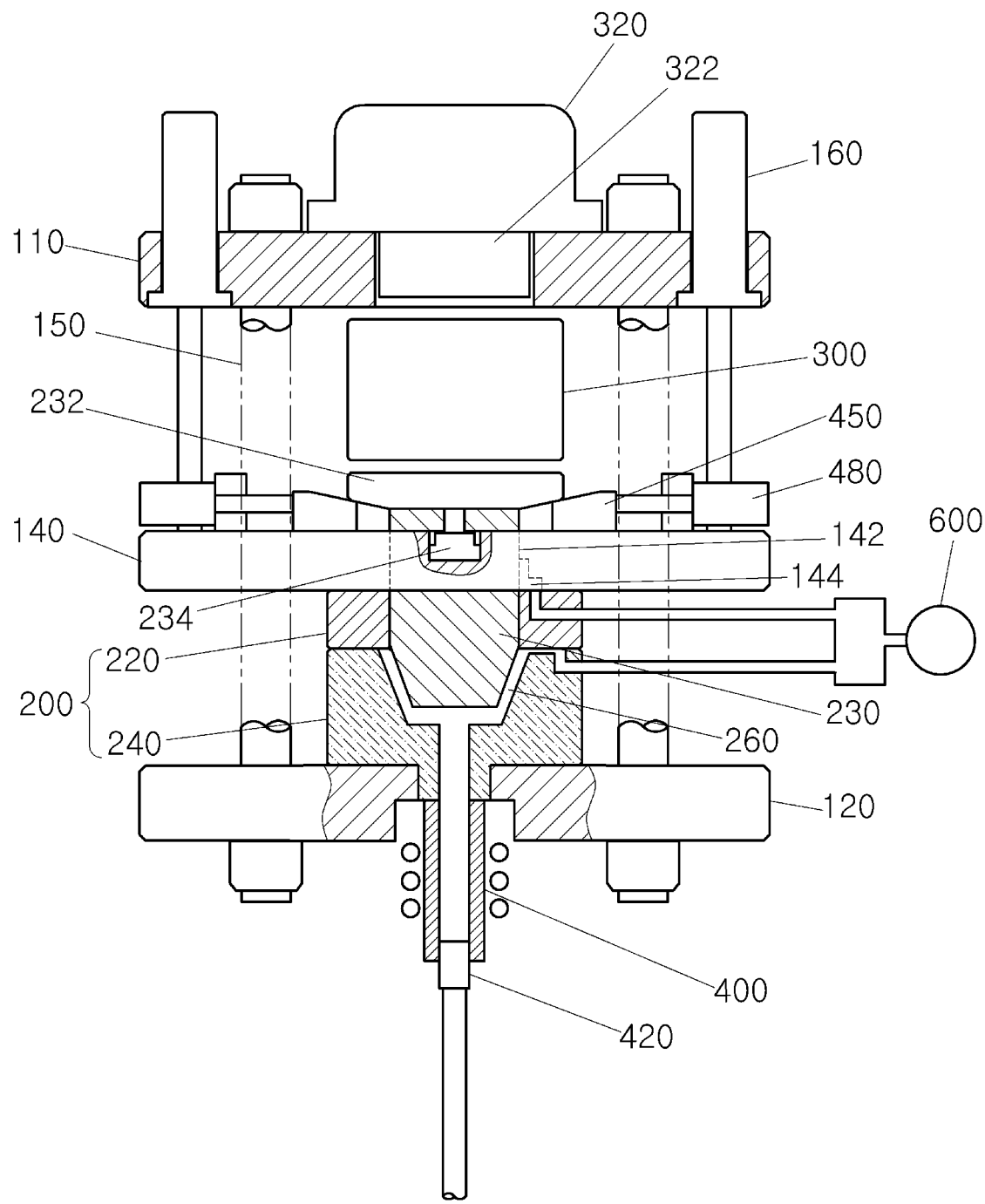
FIG. 16 is an exemplary view illustrating another example of the forging apparatus to which the present disclosure is applied.

FIG. 16 is an exemplary view illustrating another example of the forging apparatus to which the present disclosure is applied.

As illustrated in the drawing, the forging apparatus according to another example of the present disclosure may further include a wedge 450 that is inserted into and fitted between the movable platen 140 and the punch support 232 which is formed on the rear end of the punch 230.

The wedge 450 may be formed on an upper surface of the movable platen 140, and has a structure in which a lower surface of the wedge 450 is formed to be flat and an upper surface of the wedge 450 is formed to be inclined downward toward an end of the wedge 450. The wedge 450 is formed such that the wedge 450 is moved forward and backward by a wedge cylinder 480. Therefore, as the wedge 450 is moved forward, the wedge 450 may fill a wider gap between the punch support 232 and the movable platen 140. As the wedge 450 is moved forward, the wedge 450 performs the same action that a space between the punch support 232 and the movable platen 140 is splayed more widely.

The wedge 450 may be formed such that the wedge is in a state of being completely getting out of the space between the punch support 232 and the movable platen 140 while the wedge 450 is in a normal state. However, preferably, the wedge 450 is formed such that the end of the wedge 450 is in a state of being introduced into the space between the punch support 232 and the movable platen 140 when the wedge 450 is completely moved backward. In the state in which the end of the wedge 450 is fitted into the space between the punch support 232 and the movable platen 140, the wedge 450 is moved forward and backward.

In a state in which the pressing block 300 is positioned between the first fixed platen 110 and the movable platen 140, the wedge 450 moves forward when the punch 230 is moved backward, so that the wedge 450 fills the space between the punch support 232 and the movable platen 140. As the pressing block 300 is pushed backward by the backward movement of the punch 230, the rear end of the pressing block 300 is in contact with the first fixed platen 110. In this state, the wedge 450 fills the gap formed between the punch support 232 and the movable platen 140. As such, when the wedge 450 fills the gap between the punch support 232 and the movable platen 140, the movable platen 140 is no longer able to be moved backward.

Preferably, a plurality of wedges 450 is provided, and is formed such that the plurality of wedges 450 facing each other while the punch support 232 is placed therebetween. This configuration is adopted so as to maintain a balance of the punch support 232.

Reference numerals that are not described in FIG. 16 have configurations same as the configurations as described in the forging apparatus according to an example of the present disclosure, so that descriptions thereof will be omitted.

FIGS. 17 to 22 are exemplary views illustrating a process of molding a material by using the forging apparatus according to another example of the present disclosure. Here, a process of molding a material by using a mold apparatus in which the wedge 450 that is described with reference to FIG. 16 is formed will be described.

Schematically, after a material is injected into the sleeve 400, the material is molded by performing a forming process (S1) in which the molding space 260 is formed inside the mold 200 by coupling the fixed mold 240 to the movable mold 220 in which the punch 230 is formed, a positioning process (S2) in which the pressing block 300 is moved from an original position to a point where the pressing block 300 is capable of applying a pressure to the mold 200, an injecting process (S3) in which the material injected into the sleeve 400 is injected into the molding space 260, a punching process (S4) in which a pressure is applied by moving the pressing block 300 forward to the mold 200 so that the pressure is applied to the punch 230 and the material injected into the molding space 260 is punched, a returning process (S5) in which the pressing block 300 is returned to the original position, and a releasing process (S6) in which the movable mold 220 and the fixed mold 240 are splayed apart and a molded article is released from the molding space 260. In the process, the wedge 450 is used.

Figure 17:
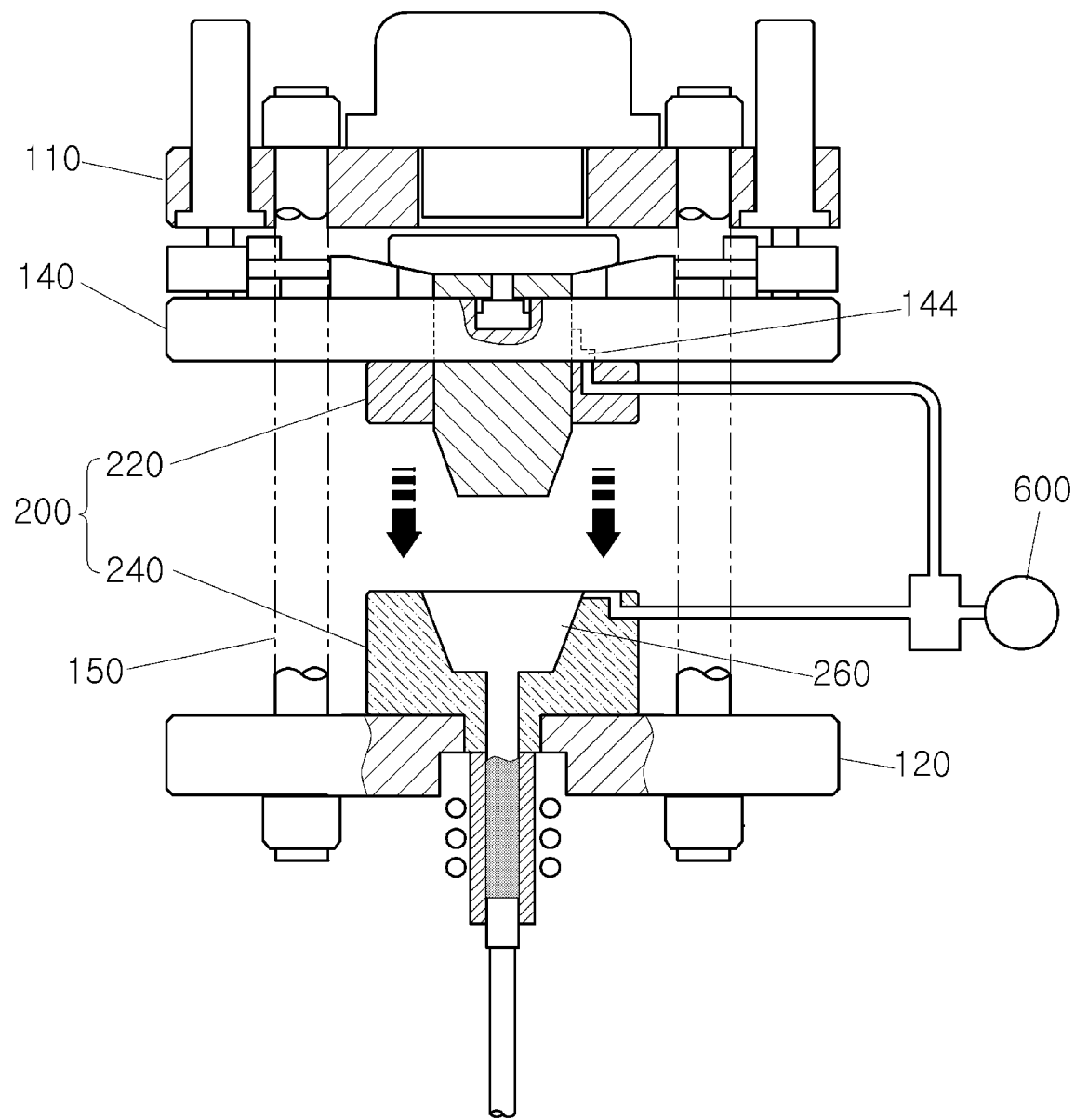
FIGS. 17 to 22 are exemplary views illustrating a process of molding a material by using the forging apparatus according to another example of the present disclosure.
Figure 18:
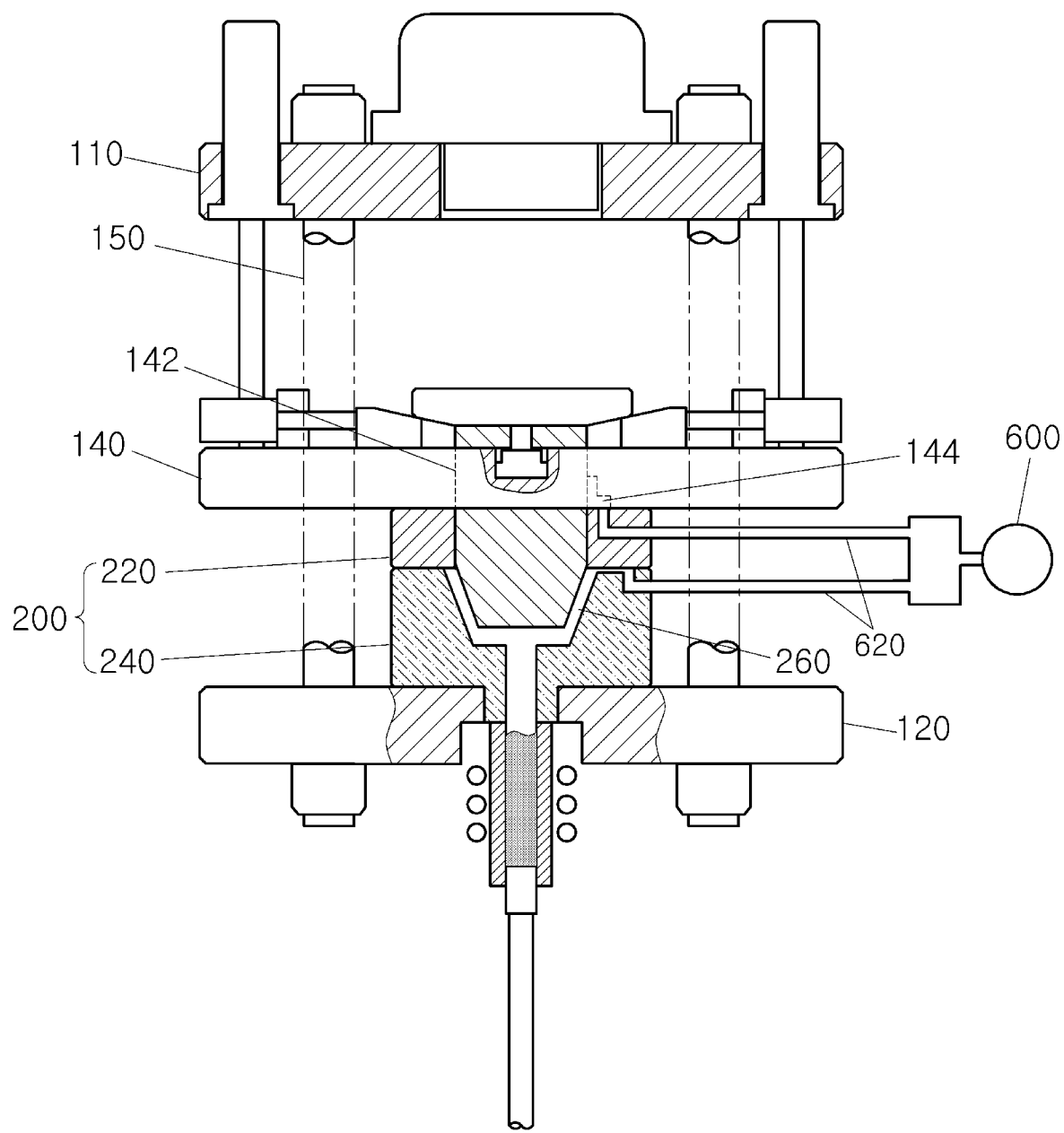

In the forming process (S1), after the injection of the material is finished while the molding space 260 is open by moving the movable platen 140 backward, the movable platen 140 is moved forward while the fixed mold 240 is in the state of being fixed to the second fixed platen 120. By operating the mold opening and closing cylinders 160 mounted at the first fixed platen 110, the movable platen 140 is moved forward along the tie bars 150. Accordingly, the movable mold 220 formed on the movable platen 140 is moved toward the fixed mold 240 and is coupled to the fixed mold 240, so that the molding space 260 is formed inside the mold 200 (FIGS. 17 and 18). Meanwhile, by operating the exhaust apparatus 600 after the forming process (S1), air may be simultaneously suctioned from the molding space 260 and the rear space 144 that is formed in the through hole 142. By simultaneously suctioning air through the exhaust pipes 620 that are respectively connected to the rear space 144 and the molding space 260, the vacuum state is formed inside the molding space 260.

In the positioning process (S2), the pressing block 300 is moved by lifting up the pressing block 300 with a separate apparatus. Otherwise, when an actuator is provided, the pressing block 300 is moved to a point between the first fixed platen 110 and the movable platen 140 by operating the actuator, in which the point is a position where the pressing block 300 is capable of applying a pressure to the mold 200. When a selection of the position of the pressing block 300 is finished, the punch 230 is moved backward toward the pressing block 300 to a predetermined amount of level. The punch 230 is moved backward by operating the punch cylinder 234 (FIG. 16).

Figure 19:
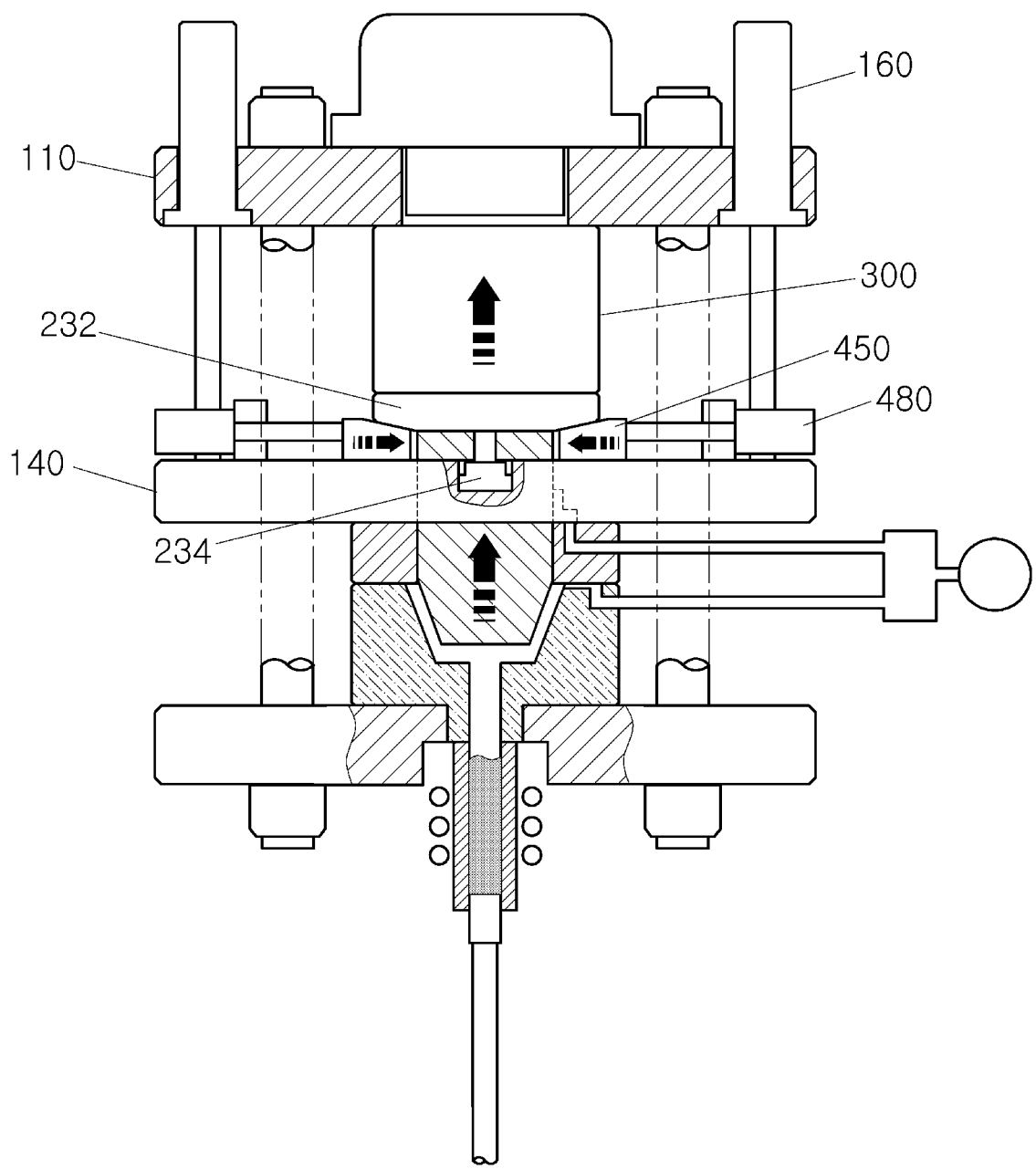

After the positioning process (S2), the punch 230 is moved backward to the pressing block 300. The punch 230 is moved backward by operating the punch cylinder 234. Accordingly, the punch 230 is pushed until the rear end of the pressing block 300 is in contact with the first fixed platen 110, and the space between the punch support 232 and the movable platen 140 are splayed, so that the gap is formed. The wedge 450 operated by the wedge cylinder 480 is moved forward to the gap that is formed as described above. As a result, the wedge 450 fills the gap. At this time, the backward movement of the punch 230 and the forward movement of the wedge 450 may be simultaneously performed. That is, the punch 230 is moved backward and the wedge 450 is moved forward according to a level to which the punch support 232 and the movable platen 140 are splayed apart, so that the wedge 450 fills the gap (FIG. 19). Therefore, the movable platen 140 is in a state of being no longer able to move backward.

Figure 20:
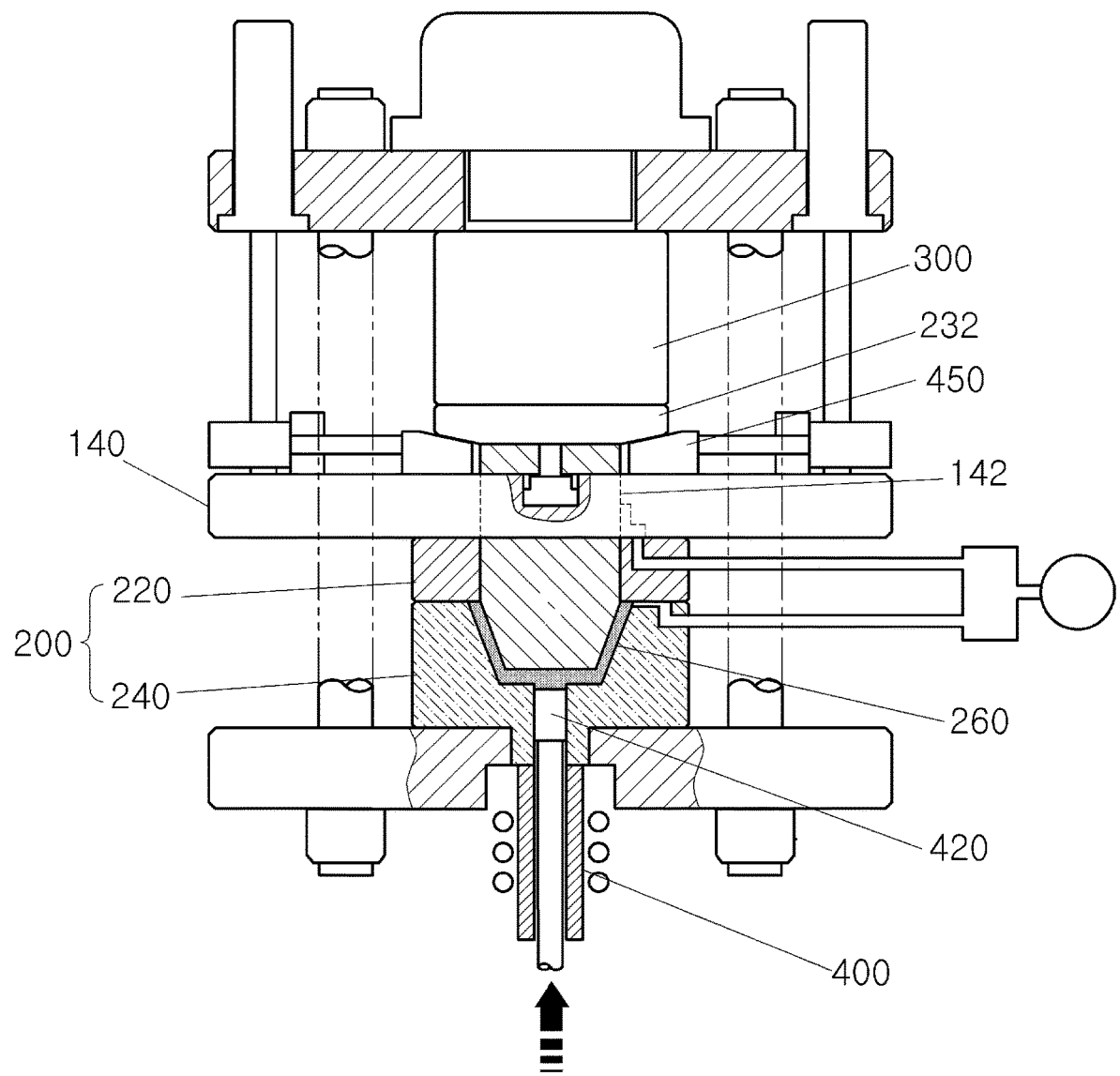

In the injecting process (S3), the material is pushed and injected into the molding space 260 by using the pressing plunger 420 that is formed at the sleeve 400. At this time, the material injected into the sleeve 400 may be in the molten metal state. Otherwise, the material may be in the molten metal state or the semi-molten metal state by heating and melting the material. Further, in the process in which the material is pushed by the pressing plunger 420 and is injected into the molding space 260, a considerable amount of pressure is generated. However, since the movable platen 140 is in a state in which the movement of the movable platen 140 is restricted by the pressing block 300, the punch support 232, and the wedge 450, the movable mold 220 and the fixed mold 240 are not splayed apart (FIG. 20).

In the punching process (S4), a pressure is applied to the pressing block 300 by using the pressing means (for example, the pressing cylinder 320 formed such that the first ram 322 is capable of being pulled out or pushed into the pressing cylinder 320) formed at the first fixed platen 110. At this time, in order for the pressing block 300 to be moved forward, the wedge 450 is moved backward to the original position. The backward movement of the wedge 450 and the forward movement of the pressing block 300 may be simultaneously performed.

Figure 21:
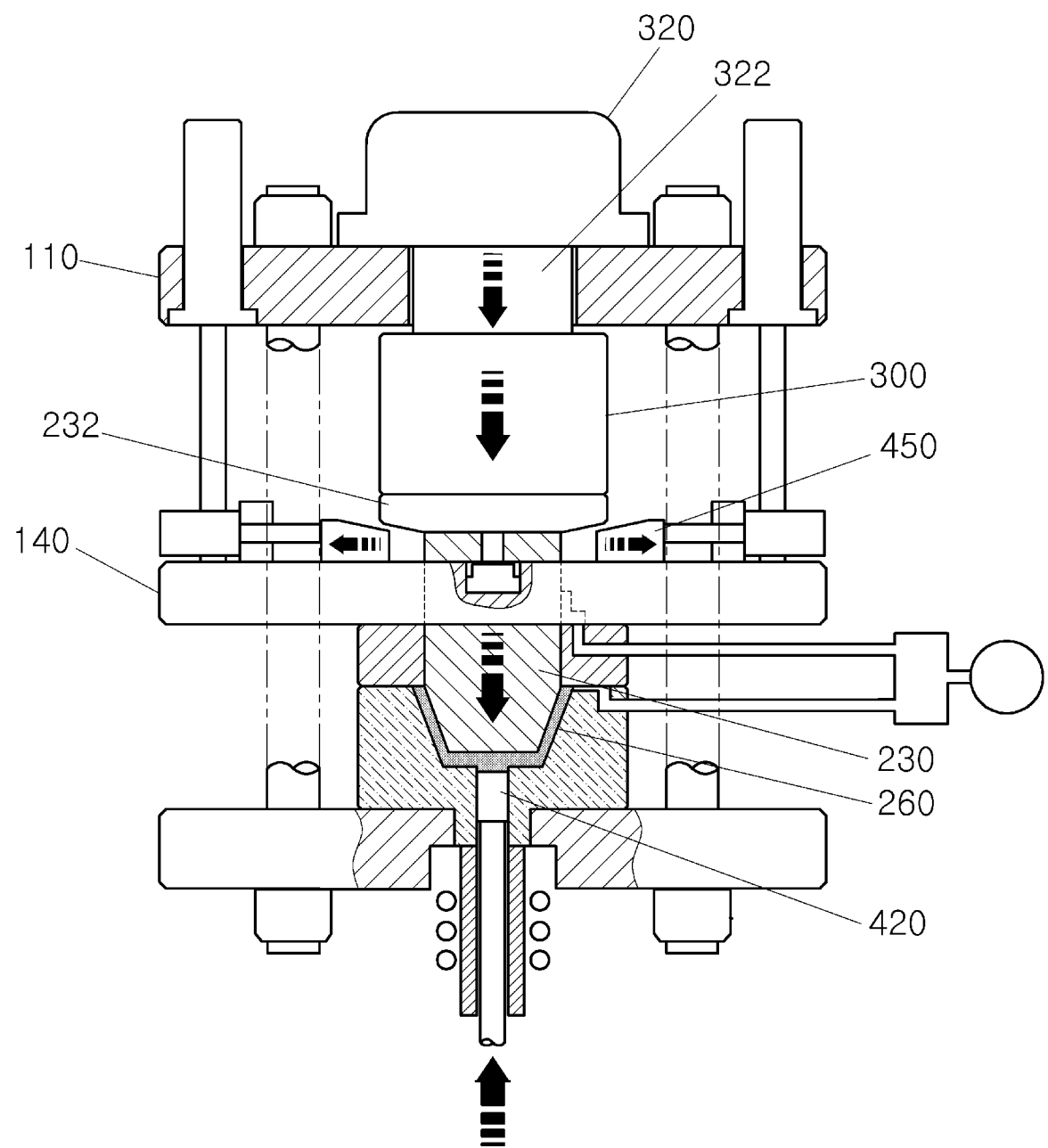

Meanwhile, e pressing block 300 is configured such that the pressing block 300 is capable of generating a pressure from the pressing block 300, the pressing block 300 generates a pressure while the rear end of the pressing block 300 is in the state of being supported on the first fixed platen 110, so that the pressure is applied to the movable platen 140 and the punch support 232. Accordingly, the punch 230 moved backward also receives the pressure and is moved forward to the molding space 260, and the punch 230 punches the molten metal injected into the molding space 260, thereby performing forging molding. At this time, the pressing plunger 420 may also apply a pressure together with the punch 230 to the material by pushing the material (FIG. 21).

After the punching process (S4), when the molten metal is left for a predetermined amount of time, the molten metal injected into the molding space 260 is solidified.

In the returning process (S5), the pressing block 300 is returned to the original position. The pressure applied to the pressing block 300 by the pressing means is released, and the pressing block 300 positioned between the first fixed platen 110 and the movable platen 140 is returned to the original position.

Figure 22:
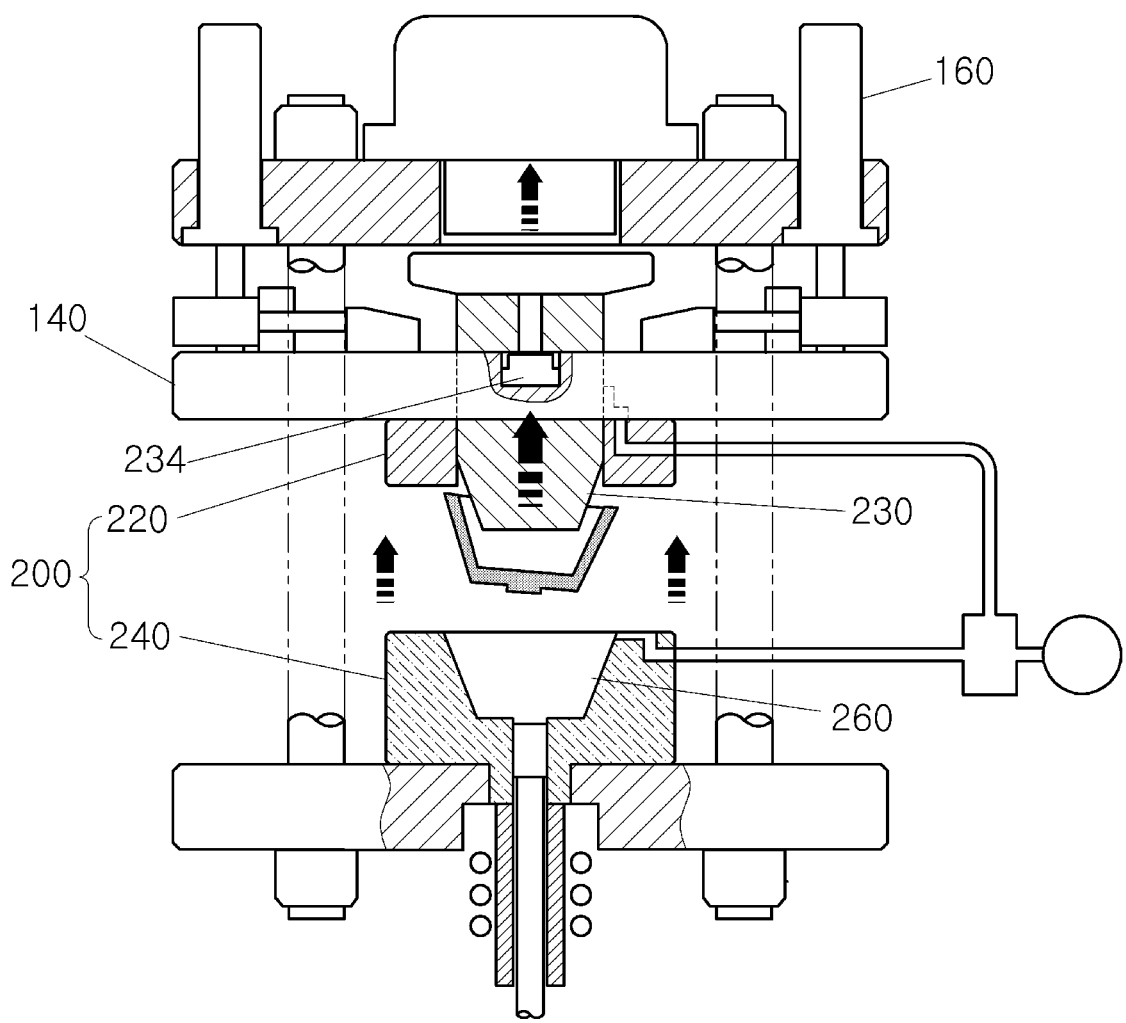

In the releasing process (S6), by moving the movable mold 220 backward, the movable mold 220 and the fixed mold 240 are splayed apart. By operating the mold opening and closing cylinders 160 so that the movable platen 140 is moved backward, the movable mold 220 is returned to the original position. Accordingly, the molded article is capable of being released. At this time, the molded article may be in a state of being attached to the end of the punch 230. In this situation, by operating the punch cylinder 234 so that the punch 230 is moved backward, the molded article attached to the end of the punch 230 is naturally detached and released (FIG. 22).

By the process as described above, forging molding is performed on the material by using the wedge 450, so that the molded article may be formed.

DESCRIPTION OF REFERENCE NUMERALS

110: first fixed platen, 112: rail,
120: second fixed platen, 140: movable platen,
142: through hole, 144: rear space,
150: tie bar, 160: mold opening and closing cylinder,
200: mold, 220: movable mold,
230: punch, 232: punch support,
234: punch cylinder,
240: fixed mold, 250: ejector cylinder,
252: ejector pin, 260: molding space,
300: pressing block, 302: accommodating space,
306: block cylinder, 307: second ram,
320: pressing cylinder, 322: first ram,
340: support bracket, 342: slide guide,
344: spring bracket, 346: spring,
360: toggle link, 362: toggle actuating rod,
400: sleeve, 420: pressing plunger,
440: runner pipe, 460: molten metal injection port,
450: wedge, 480: wedge cylinder,
500: actuator,
600: exhaust apparatus, 620: exhaust pipe.

What is claimed is:

1. An apparatus for molding a material, the apparatus comprising:
   first and second fixed platens (110 and 120) which are provided as a pair and spaced a predetermined distance from each other by a tie bar (150);
   a movable platen (140) formed such that the movable platen (140) is capable of moving along the tie bar (150) between the first and second fixed platens (110 and 120);
   a mold (200) which is provided with a movable mold (220) formed on the movable platen (140) and with a fixed mold (240) formed on the second fixed platen (120) and which forms a molding space (260) in a point where the movable mold (220) and the fixed mold (240) are in contact with each other, wherein the molding space (260) is formed such that the molding space (260) is capable of being open or closed as the movable mold (220) moves in a direction toward or away from the fixed mold (240);

a pressing block (300) formed such that the pressing block (300) is capable of being moved at a position deviated from between the first fixed platen (110) and the movable platen (140) by an actuator (500), the pressing block (300) being capable of applying a pressure to the movable mold (220) when the pressing block (300) is moved between the first fixed platen (110) and the movable platen (140) by the actuator (500); and a punch (230) which penetrates the movable platen (140) and the movable mold (220) and reaches the molding space (260) and which has a rear end provided with a punch support (232), the punch (230) being configured to move forward or backward by a punch cylinder (234) that is formed between the movable platen (140) and the punch support (232), thereby being used as a forging mold.

2. The apparatus of claim 1, further comprising a wedge (450) which is mounted on an upper surface of the movable platen (140) and which enters between the punch support (232) and the movable platen (140) when the punch (230) moves backward, the wedge (450) being configured to enter between the punch support (232) and the movable platen (140) when the punch (230) moves backward while the pressing block (300) is in a state of being positioned between the first fixed platen (110) and the movable platen (140), thereby restricting the movable platen (140) from moving backward.

3. The apparatus of claim 2, wherein the wedge (450) comprises a plurality of wedges (450), and the plurality of wedges (450) is formed such that the plurality of wedges (450) is facing each other while the punch support (232) is placed therebetween.

4. The apparatus of claim 1, wherein the molding space (260) and an entrance of a through hole (142) through which the punch (230) passes are sealed by a packing, a rear space (144) is formed inside the through hole (142), and exhaust pipes (620) are respectively connected to the rear space (144) and the molding space (260), so that air is capable of being simultaneously suctioned from two points to which the exhaust pipes (620) are connected.

5. The apparatus of claim 1, wherein the pressing block (300) comprises a plurality of pressing blocks (300).

\* \* \* \* \*